United States Patent
Jones et al.

(10) Patent No.: US 11,853,926 B1
(45) Date of Patent: Dec. 26, 2023

(54) SYSTEM AND METHOD FOR POST-ACCIDENT INFORMATION GATHERING

(71) Applicant: State Farm Mutual Automobile Insurance Company, Bloomington, IL (US)

(72) Inventors: Tracy E. Jones, Normal, IL (US); Carlie Kellerman, Bloomington, IL (US); Ben Schoer, Tucker, GA (US); Joy Llena, Lawrenceville, GA (US); Akilah Hugine, Roswell, GA (US); Yvette Simmons, Atlanta, GA (US); Aishwarya Chenji, Cumming, GA (US); Pramiti Khan, Scottdale, GA (US); Deborah Taylor, Bloomington, IL (US); Barry Richards, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 16/439,112

(22) Filed: Jun. 12, 2019

Related U.S. Application Data

(60) Provisional application No. 62/684,052, filed on Jun. 12, 2018.

(51) Int. Cl.
*G06F 17/00* (2019.01)
*G06Q 40/08* (2012.01)
(Continued)

(52) U.S. Cl.
CPC .......... *G06Q 40/08* (2013.01); *G06F 3/0481* (2013.01); *G06F 16/2455* (2019.01);
(Continued)

(58) Field of Classification Search
CPC .. G06F 16/432; G06F 40/174; G06F 16/2455; G06F 3/0481; G06Q 40/08;
(Continued)

(56) References Cited

U.S. PATENT DOCUMENTS

| 8,260,639 | B1 | 9/2012 | Medina, III et al. |
| 8,712,893 | B1 * | 4/2014 | Brandmaier ............ G06F 16/51 705/35 |

(Continued)

*Primary Examiner* — Stephen S Hong
*Assistant Examiner* — Matthew J Ludwig
(74) *Attorney, Agent, or Firm* — FAEGRE DRINKER BIDDLE & REATH LLP

(57) ABSTRACT

A system and method for guiding a user after an accident and gathering relevant data for an insurance claim and/or a coverage determination. The system includes a mobile device having a memory element, processing element, communication element and user interface. The mobile device may also include a sensor and/or global positioning system. The user interface and/or sensor of the mobile device (e.g., microphone. UPS, camera, etc.) may receive information relevant to an insurance claim, including by directing a user to capture images of relevant objects and/or querying the user for verbal description(s) of facts regarding the accident. The information gathered may be saved on the memory element of the mobile device. The information may also be transmitted to a server via a network in the form of a structured incident data report.

21 Claims, 11 Drawing Sheets

(51) Int. Cl.
  *G06F 16/2455* (2019.01)
  *G06F 3/0481* (2022.01)
  *G06F 40/174* (2020.01)
  *G10L 15/26* (2006.01)
  *G06V 30/18* (2022.01)

(52) U.S. Cl.
  CPC ............ *G06F 40/174* (2020.01); *G06V 30/18* (2022.01); *G10L 15/26* (2013.01)

(58) Field of Classification Search
  CPC ...... G06Q 40/123; G06V 10/40; G06V 30/20; G06V 30/18; G10L 15/26
  USPC ........................................ 715/224, 825, 226
  See application file for complete search history.

(56) References Cited

U.S. PATENT DOCUMENTS

| | | | |
|---|---|---|---|
| 8,799,034 B1 | 8/2014 | Brandmaier et al. | |
| 9,053,588 B1* | 6/2015 | Briggs | G07C 5/006 |
| 9,865,019 B2* | 1/2018 | Bogovich | H04W 4/024 |
| 10,096,072 B1* | 10/2018 | Ali | G06Q 40/123 |
| 10,102,586 B1* | 10/2018 | Marlow | B64C 39/024 |
| 10,114,906 B1* | 10/2018 | Becker | G06F 40/137 |
| 10,217,168 B2* | 2/2019 | Tofte | G06Q 10/06 |
| 10,417,713 B1* | 9/2019 | Brandmaier | B60R 21/0136 |
| 10,628,894 B1* | 4/2020 | Ioannou | G06Q 40/123 |
| 10,671,805 B2* | 6/2020 | Pennington | G06F 40/174 |
| 10,740,853 B1* | 8/2020 | Laaser | G06Q 40/123 |
| 10,803,525 B1* | 10/2020 | Augustine | G06Q 40/08 |
| 10,803,527 B1* | 10/2020 | Zankat | G06V 30/40 |
| 10,872,380 B2* | 12/2020 | Bogovich | G01C 21/3415 |
| 10,956,983 B1* | 3/2021 | Biemer | G06Q 40/08 |
| 11,361,380 B2* | 6/2022 | Kelsh | H04W 4/90 |
| 2009/0234678 A1* | 9/2009 | Arenas | G06Q 40/08 705/4 |
| 2010/0036683 A1* | 2/2010 | Logan | G06Q 10/10 705/4 |
| 2010/0174564 A1* | 7/2010 | Stender | G06Q 10/10 709/206 |
| 2011/0161118 A1* | 6/2011 | Borden | G06Q 50/22 705/4 |
| 2011/0213628 A1* | 9/2011 | Peak | G06Q 40/08 705/4 |
| 2011/0218825 A1* | 9/2011 | Hertenstein | G06Q 40/08 715/849 |
| 2012/0143630 A1* | 6/2012 | Hertenstein | G06Q 40/08 705/4 |
| 2013/0204645 A1* | 8/2013 | Lehman | G06Q 20/322 705/4 |
| 2013/0297352 A1* | 11/2013 | Noe | G06Q 10/02 705/4 |
| 2013/0297353 A1* | 11/2013 | Strange | G06Q 40/08 705/4 |
| 2014/0244456 A1* | 8/2014 | Huang | G06Q 40/123 705/31 |
| 2015/0052187 A1* | 2/2015 | Schultz | G06Q 30/01 709/203 |
| 2016/0189310 A1* | 6/2016 | O'Kane | G06F 16/258 705/4 |
| 2017/0206609 A1 | 7/2017 | Meoli et al. | |
| 2018/0268489 A1* | 9/2018 | McDonnell | G06Q 40/08 |
| 2018/0322472 A1* | 11/2018 | Russell | G06Q 30/0645 |
| 2019/0171745 A1* | 6/2019 | Kline | G06N 5/041 |
| 2021/0174456 A1* | 6/2021 | Mousty | G06Q 40/08 |

* cited by examiner

Your Coverage

Based on what you provided, this would be a collision loss with a $500 Collision Deductible for your 2015 VW Tiguan. — 1112

Collision Coverage Details:

Collision coverage helps pay to repair or replace your vehicle if it collides with another vehicle or object.

Other coverages that may apply:

- Rental
- Rental car reimbursement pays the cost of renting a replacement vehicle while your car is in the shop. Travel expense coverage helps pays for meals, lodging, and transportation if you're in an accident more than 50 miles from home

— 1110

Overview | Insurance | Finance | More

FIG. 11

SYSTEM AND METHOD FOR POST-ACCIDENT INFORMATION GATHERING

RELATED APPLICATIONS

The current patent application is a non-provisional patent application which claims priority benefit with regard to all common subject matter to U.S. Provisional Application Ser. No. 62/684,052, titled "SYSTEM AND METHOD FOR POST-ACCIDENT INFORMATION GATHERING", filed Jun. 12, 2018, which is hereby incorporated by reference in its entirety into the current patent application.

FIELD OF THE INVENTION

The present invention generally relates to a mobile application, system, and computer-implemented method for collecting information after an accident that may be relevant to an insurance claim.

BACKGROUND

When an accident occurs, it is usually best to gather information relevant to an insurance claim soon after the accident because the parties involved are usually present, and memories regarding the accident are fresh. However, the people involved may not recall or be aware of what information should be gathered to document the event for insurance, liability and/or other purposes. Moreover, accidents are stressful and sometimes traumatizing experiences, often leaving such individuals unable to think clearly to gather information correctly and completely.

Present technologies for guiding a user often result in incomplete and inaccurate information collection due to user error or ignorance regarding required data. This requires insurance companies to take additional time-consuming steps to collect all necessary information to begin a claims process. Further, present technologies for assisting users after accidents only provide various forms of raw data that must be further processed and analyzed by the insurance company upon receipt; however, the processing of the raw data may create inaccuracies or lead to gaps in necessary information, which would require re-gathering information at a later date. Re-gathering and collecting new information long after the accident occurred may multiply the inaccuracies due to human forgetfulness.

BRIEF SUMMARY

Embodiments of the present technology relate to systems, computer-implemented methods, systems comprising computer-readable media, and electronic devices for generating, collecting, attaching metadata to, storing electronic records, transmitting, and/or receiving data related to vehicle, insurance, and accident information. Embodiments provide for efficient data collection and enriched data storage of information relevant to an accident insurance claim.

In one aspect, a computer-implemented method for capturing vehicle incident data may be provided. The method may include, via one or more processors and/or associated communication elements (such as via wired or wireless communication or data transmission over one or more communication channels): (1) receiving, via a user interface, a start data collection request; (2) receiving, via the user interface, a selection of an incident type from an automatically populated set of incident types; (3) accessing a database storing a plurality of predetermined data inquiry sets, each data inquiry set defining at least one predetermined data type collection request corresponding to an incident type of the automatically populated set of incident types; (4) comparing, via the processor, the selection against the plurality of data inquiry sets to determine a matched data inquiry set for the selection; (5) displaying, via the user interface, the at least one predetermined data type collection request of the matched data inquiry set; (6) receiving, via at least one of the user interface, a communication element, and a sensor, incident data in response to the at least one predetermined data type collection request; (7) receiving, via the communication element, related data; (8) comparing the incident data and related data to determine at least one inconsistency; and (9) storing, via the processor, the received incident data, portions of the related data, and the at least one inconsistency. The method may include additional, fewer, or alternative actions, including those discussed elsewhere herein, and may be implemented via one or more local or remote processors, and/or via computer executable instructions stored on non-transitory computer-readable media or medium.

In another aspect, a system comprising computer-readable media for capturing vehicle incident data may be provided. The system may include a first non-transitory computer-readable medium with a program stored thereon, wherein the program instructs a processing element of a mobile electronic device to perform the following: (1) receive a start data collection request from a user interface of the mobile electronic device; (2) receive a selection of an incident type from an automatically populated set of incident types from the user interface; (3) access a database storing a plurality of predetermined data inquiry sets, each data inquiry set defining at least one predetermined data type collection request corresponding to an incident type of the automatically populated set of incident types; (4) compare the selection against the plurality of data inquiry sets to determine a matched data inquiry set for the selection; (5) display the at least one predetermined data type collection request of the matched data inquiry set on the user interface; (6) receive incident data in response to the at least one predetermined data type collection request; (7) receive related data; (8) compare the incident data and the related data to determine at least one inconsistency; and (9) store the received incident data, portions of the related data, and the at least one inconsistency. The programs stored on the computer-readable media may instruct the processing elements to perform additional, fewer, or alternative actions, including those discussed elsewhere herein.

In another aspect, a mobile electronic device for capturing vehicle incident data may be provided. The mobile electronic device may include a user interface, a sensor, a memory element, and/or a processing element. The user interface may be configured to receive incident data, and the sensor may be configured to capture incident data. The memory element may be in electronic communication with the sensor and the user interface. The processing element may be in electronic communication with the user interface, the sensor, and the memory element. The processing element may be configured to: (1) receive a start data collection request from the user interface; (2) receive from the user interface a selection of an incident type from an automatically populated set of incident types; (3) access a database storing a plurality of predetermined data inquiry sets, each data inquiry set defining at least one predetermined data type collection request corresponding to an incident type of the automatically populated set of incident types; (4) compare the selection against the plurality of data inquiry sets to determine a matched data inquiry set for the selection; (5) display the at least one predetermined data type collection request of the matched data inquiry set on the user interface; (6) receive incident data in response to the at least one predetermined data type collection request; (7) receive related data; (8) compare the incident data and the related data to determine at least one inconsistency; and (9) store the received incident data, portions of the related data, and the at least one inconsistency. The mobile electronic device may include additional, fewer, or alternate components and/or functionality, including that discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

FIG. 11 illustrates various components of an exemplars, user interface according to embodiments of the present inventive concept.

Figure 1:
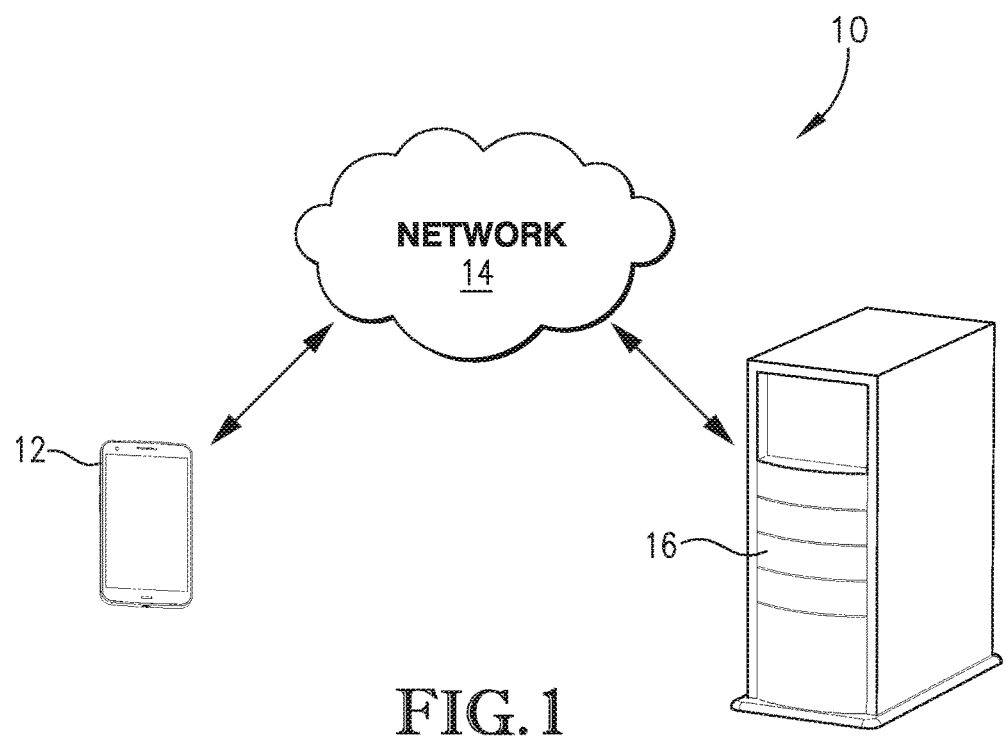
FIG. 1 illustrates an exemplary environment in which embodiments of a system may be utilized for gathering information.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter cilia, collecting incident data relevant to a potential claim dealing with a vehicle incident via a mobile electronic device; collecting the incident data using a sensor and/or a user interface; generating a structured incident data report; transmitting the structured incident data report to file a claim; and/or analyzing the structured incident data to determine coverage. Embodiments of the present invention may enable accurate and comprehensive collection of incident data relevant to an insurance claim, thereby reducing human error and loss of data due to deficiencies in human memory. Embodiments of the present invention may also enable comprehensive and relevant data-gathering by unskilled users through automated guidance of investigation(s) and data-gathering. The incident data may be collected in, stored in, and/or organized into a structured format so that it may be analyzed by an insurance provider, server or processor, and/or through machine learning techniques or artificial intelligence (AI) installed on a local mobile electronic device or from a remote server.

Utilizing automated data collection guidance and techniques of embodiments of the present invention, an unskilled user with a mobile electronic device may avoid the pitfalls presented by existing technology, creating efficiencies for the user and an insurance provider.

Automated data collection procedures implemented via a mobile electronic device such as a mobile phone according to embodiments of the present invention may permit convenient, efficient, and accurate data capture without the need for follow-up data collection and/or visits and/or telephone interviews with expert personnel. In addition, incident data collected via the methods and systems described herein may be introduced to machine learning environments that may be trained to analyze the incident data to automate aspects of insurance claim and/or damage assessment and/or further improve automated data-gathering aspects of the present inventive concept.

An exemplary data capture process may generate important incident data such as information about one or more other drivers e.g., if a third party was involved such as name, phone number, insurance company, policy number, license plate, vehicle identification number (VIN), driver's license number and/or issuing state, photographs of indicia embodying any of the foregoing information (e.g., of driver's license, license plate, etc.), witness names, witness phone numbers, witness statements and/or audio files and/or text files thereof (e.g., generated using talk-to-text software), images of the user's car and/or of any other car involved, makes and/or models of involved cars, year of manufacture of involved cars, images of the incident scene, images of collateral damage and/or personal injuries, metadata generated from any of the aforementioned or other relevant images (such as location and time of the incident and/or of image capture), data related to weather conditions, the location, date, and time of the incident, whether the incident occurred on a one-way or two-way street, etc. One of ordinary skill will appreciate that a wide variety of potentially relevant information in a wide variety of forms and media is within the scope of the present invention.

Related data may be received for accuracy, efficiency, and/or completeness. The related data may include information regarding any of the parties involved in the incident, information regarding their vehicles, licenses, insurance policies, etc. pre-existing and stored on an insurance provider and/or third-party database. The database may be accessed so that the related data may be received. The related data may be used to determine any discrepancy in the incident data. For instance, portions of the incident data may be compared with portions of the related data to identify conflicts. If there are discrepancies, an inconsistency flag for that incident data may be denoted.

Portions of the incident data may be overwritten with portions of the related data. For example, whether there are portions of the related data without corresponding portions of the incident data may be determined. The related data may be used to supplement the incident data and stored where there is any such missing corresponding incident data.

Some or all of the incident data and/or related data may be organized into a structured incident data report using a report template, as described in more detail elsewhere herein. The structured incident data report may be transmitted as part of a claim initiation process to a remote computing device, such as a server configured to store data in connection with claims processing. However, to address first notice of loss and other issues, the user mobile device may require explicit instructions from the user prior to transmission of the structured incident data report. For example, the device may be configured to notify a user when a claim has not been filed and require that the user take affirmative steps to file a claim and send the structured incident data report.

The structured incident data report and/or report template may be analyzed by a processor or processing element (e.g., of the mobile device and/or a remote server) to identify missing data, make a preliminary fault determination, make a preliminary assessment of whether a claimant or potential claimant may be committing insurance fraud, determine whether there is enough data to provide repair cost predictions, calculate insurance policy coverage, assess operability of vehicles, predict repair costs, or the like. It is foreseen that the report template and/or structured incident data report may be put to a wide variety of uses without departing from the spirit of the present invention.

Exemplary Data Capture

A vehicular accident insurance claim is generally filed soon after the accident. Such accidents may be of multiple types, including multiple vehicle accidents, single vehicle accidents, weather-related accidents, etc. When an insured files a claim, it is generally required for an insurer to gather information about covered damaged property, which may include recording information about the damages that will help in generating subsequent analyses and estimates.

The incident data may be information about one or more third-party drivers if a third party was involved such as name, phone number, insurance company, policy number, license plate, driver's license number, state that issued the driver's license, images of official documents (e.g., insurance card, driver's license, license plate), witnesses, witness names, witness phone numbers, witness statements, audio files and/or text files (generated using talk-to-text software) of witness statements, images of the user's car and images of any other car involved, makes of the relevant cars, models of the relevant cars, year of manufacture of the relevant cars, images of the incident scene, metadata generated from the images (such as location and time of the incident), data related to weather during the accident, live data feeds (such as weather, temperature, speed, GPS coordinates, etc.), and the location, date, and time of the incident, etc.

Embodiments of the present invention provide improved, automated technologies for guiding an insured user through gathering incident data and claim initiation processes in a manner that preserves valuable and comprehensive data and increases efficiencies of the user and the insurer. More particularly, such automated technologies may include a mobile electronic device of the user that executes a program for capturing incident data.

The program may instruct a processing element of the mobile electronic device to: (1) receive a start data collection request from a user interface of the mobile electronic device; (2) receive a selection of an incident type from an automatically populated set of incident types from the user interface; (3) access a database storing a plurality of predetermined data inquiry sets, each data inquiry set defining at least one predetermined data type collection request corresponding to an incident type of the automatically populated set of incident types; (4) compare the selection against the plurality of data inquiry sets to determine a matched data inquiry set for the selection; (5) display the at least one predetermined data type collection request of the matched data inquiry set on the user interface; (6) receive incident data in response to the at least one predetermined data type collection request; (7) receive related data; (8) compare the incident data and the related data to determine at least one inconsistency; and (9) store the received incident data, portions of the related data, and the at least one inconsistency.

The start data collection request may be received as user input via the user interface. The start data collection request may also be received as user input via a microphone sensor of the mobile electronic device, for example where embodied by a verbal command, instruction, notice, etc. referencing the occurrence of an incident or otherwise indicating a start data collection request. For example, the program may be pre-programmed to treat the spoken phrase "begin accident data collection" as the start data collection request, whereupon the user could access a mobile electronic device assistant via voice command and speak the aforementioned phrase to initiate data collection processes.

In an embodiment, the start data collection request may partly or completely comprise input other than user input. The program may be configured to treat data received from a sensor and/or third-party device(s) and/or databases as the start data collection request. For instance, sensor data from an accelerometer of the user mobile device may indicate the occurrence of a collision. Other sensor data from the microphone of the mobile device may receive and interpret audio representing human voices speaking without strain or stress. This combined sensor data, together with a determination that the collision occurred recently and/or that the user is still in the vicinity of the collision (according to GPS data), may comprise the start data collection request recognized by the program to initiate automated data collection guidance.

In an embodiment, the start data collection request may also be received via a communication element of the mobile electronic device. For example, the mobile electronic device may receive a text, email, message, or the like, via the communication element, containing data (e.g., words) that the program is pre-configured to treat as a start data collection request.

The program may also be configured to initiate automated data collection guidance according to the steps outlined herein or according to other actions and/or messages/input. For instance, the mobile electronic device may receive a link, and/or file through a text, email, message or the like, via the communication element, the link being configured to automatically install the program and initiate the automated data collection guidance steps. It should also be noted that a different start data collection request may be generated for each incident. It is foreseen that a program may be configured to automatically recognize a variety of triggers to initiate automated data collection guidance steps without departing from the spirit of the present invention.

Following initiation of automated data collection guidance, an incident type may be determined by the program, for example via receipt of user input comprising selection of an incident type from an automatically populated set of incident types presented by instruction of the program. The automatically populated set of incident types may be a list of incident types populated and optionally periodically updated by an insurance provider, artificial intelligence and/or the program. The automatically populated set may be populated based on consideration of laws of a state in which the user is a resident, laws of a state in which the incident occurred, information about the user, information about the user's insurance policy, etc.

The program may be configured to periodically or constantly access and/or receive GPS or similar data from a location determining element of the user's mobile electronic device and may generate the list of incident types based at least in part on such data following an incident. In some embodiments, the program may also or alternatively instruct the processing element to receive incident data, such as a description of the incident from the user, analyze the incident data, and select the incident type from the automatically populated set based on the received incident data. It is foreseen that various dynamic and static information may be relied upon to inform generation of the list of incident types with respect to each particular incident without departing from the spirit of the invention.

An automatically populated set of incident types presented to a user may include very broad categories, such as, for example, a single vehicle incident category and a multiple vehicle incident category. Other exemplary categories may include incident types such as a theft incident and/or a weather-related incident, which may be treated independently as broad categories or as sub-categories following selection of a broader category such as single/multiple vehicle incident categories. Any combination or number of incident type categories and/or sub-categories may comprise an automatically populated set.

Once an incident type is determined, the program may be configured to compare the selected incident type against a plurality of data inquiry sets. The comparison may yield a matched data inquiry set. In an embodiment, the matched data inquiry set may comprise a static set of prompts/data collection requests configured to elicit certain user input(s) comprising incident data. The data collection requests of a matched data inquiry set may also or alternatively be dynamically determined, for example where the program includes an algorithm for analyzing one or more portions of the incident data in order to select and shape presentation of remaining data collection requests of the matched data inquiry set. The matched data inquiry set may be a combination of both static and dynamically-determined prompts/data collection requests. For example, a dynamic algorithm may generate a prompt/data collection request displayed to the user asking for input of a number of vehicles involved in an incident; thereafter, depending on the number of vehicles entered, the algorithm may dynamically generate a follow-up data collection request for specific incident data about each vehicle involved.

A dynamic algorithm and/or incident data processed by the dynamic algorithm may be executed and/or collected locally, e.g., on the user mobile electronic device. It is also foreseen that a program may be configured to instruct transmission of portions of incident data to remote computing device(s)— e.g., to a remote server—and to receive data and/or data collection request(s) in reply to inform presentation of the remaining data collection requests of a matched data inquiry set without departing from the spirit of the present invention.

In response to the data collection request(s) of the matched data inquiry set, the incident data may be received, for example via at least one of the user interface, a sensor, and a communication element. In an embodiment, the user interface may be configured to receive incident data comprising manual input of the user. Alternatively or additionally, the program may be configured to receive the incident data via the sensor. The sensor may be any sensor known in the art including a light sensor such as a camera, an audio sensor such as a microphone, an accelerometer, etc.

Exemplary data collection requests and corresponding received incident data may take any of a variety of forms. For instance, a data collection request may comprise a request for the user to capture sensor data, for instance by taking a picture with a photographic element of the user mobile electronic device. In connection therewith, the program may instruct the processing element of the user mobile electronic device to display an immediate reference image via the user interface. The immediate reference image may be a user-friendly, highly-readable graphical display of post-accident instructions. The program may instruct display on the user interface of a request to "Take a picture of the front-left of your car" alongside a generic drawing of a vehicle from a front-left perspective. Where exemplary drawings and/or photographs more representative of the user's specific vehicle are available for use by the program, a corresponding immediate reference image may comprise same. One of ordinary skill will immediately appreciate that a wide variety of requests and visual and/or audio aides may be incorporated into data collection requests within the scope of the present invention.

The program may also be configured to instruct display at the user interface of a data collection request for pictures of other objects or aspects of the accident scene and/or involved entities. For instance, the program may be configured to generate a data collection request for one or more photographs of the user's vehicle and/or any other vehicle involved in the accident.

In an embodiment, the program may also or alternatively be configured so that incident data may be received using the microphone and stored as an audio file, and/or as a text file generated using talk to text software, on the memory element. For example, the audio data may be related to sounds generated by the accident, names of individuals involved in the incident, statements from parties involved in the accident, and/or statements from witnesses.

The program may also be configured to receive incident data via the communication element such as through near-field communication (NFC), Bluetooth®, or the like. The communication element may receive incident data from a text message, email, message on a messaging application, or a messaging feature built in the program. The communication may include any relevant incident data and be in any form such as text, audio, or images. For example, the communication element may be configured to receive incident data about a party involved in the accident directly from that party via the communication element. Data received via the communication element may also or alternatively include telematics data collected via one or more involved vehicles, weather data collected via third party database(s), policyholder data received via one or more servers of an insurance provider, and any other type of data that may be useful in completing responses to the data collection request(s). The communication element may receive GPS data which the program may utilize to determine a location of collection of incident data, such as geolocation coordinates stored as metadata for an image. Moreover, such GPS data may be used to verify the validity of incident data received from third-party devices (e.g., to verify the proximity of the originating device to the incident and/or to the user's mobile electronic device).

The program may be configured to receive related data via the communication element for accuracy, efficiency, and/or completeness purposes. The related data may include names, phone numbers, insurance companies, policy numbers, license plate numbers, driver's license numbers, states that issued the driver's licenses, images of official documents (e.g., insurance card, driver's license, license plate), images of the user's car and images of any other car involved, makes of the relevant cars, models of the relevant cars, year of manufacture of the relevant cars, and/or any other information regarding any of the parties and/or properties involved in the incident that is pre-existing (stored prior to the accident in question) and stored on an insurance provider and/or third-party database. The related data may be received by providing relevant credentials, such as a username and passcode or security token, to a data base server. Once the server determines the user is authorized to receive certain data, the related data may be received from the server.

Incident data received according to one or more steps outlined above may be further processed, subsequent to and/or in connection with the presentation of data collection requests and incident data collection. For instance, the program may be configured to utilize optical character recognition (OCR) and/or object recognition software to analyze images for additional incident data. In an embodiment, the program may be configured to direct the user to capture images of one or more third-party driver documents via the camera of the user's mobile electronic device and may execute OCR software to recognize text on the images for storage and/or inclusion in a structured incident data report or the like. More particularly, the program may be configured to request and receive images of an insurance card, driver's license, VIN, and/or license plate, and utilize OCR to determine phone number, legal name, driver's license number, state of licensure, license plate number, insurance company, policy number and/or other information from the image(s).

In an embodiment, the program may also collect incident data identifying a state of licensure for a driver (e.g., a third-party driver), and may consult a database containing information and/or metadata regarding official state documents. Such information may, for example, identify layouts (e.g., borders, landmarks such as required text with predetermined placement, etc.) of the states' official documents to help the program identify information and/or portions of the image to capture and/or classify. Additionally or in the alternative, object character recognition algorithm(s) may be utilized to identify and classify information and/or portions of the image containing certain objects (e.g., a photograph of the driver, damaged portions of a vehicle, etc.). The program may also be configured to determine for example, using object recognition software—and/or receive information related to the make, model, and/or year of vehicles involved in and/or proximate the accident. In this manner, the program may be configured to recognize, capture and/or record portions of documents or other objects, items and/or people from an image captured by the user's mobile electronic device and/or third-party devices.

Moreover, the program may be configured to generate metadata from photographs of the accident scene and/or of relevant objects, for example to automatically determine the location and time of the incident, the weather during or soon after the accident, or to otherwise generate information that may be relevant to processing of insurance claims. Metadata and/or data extrapolated therefrom and/or from images captured by the sensor of the user's and/or a third party's mobile electronic device(s) may be combined with data from external sources (including related data) e.g., data from third party databases and/or from telematics devices of one or more vehicles—to automatically generate additional data that may be relevant to an insurance claims process. For instance, where weather conditions may be relevant to a fault analysis, photographs of the conditions at the scene immediately following the accident may be reconciled against weather database data to identify discrepancies and/or firm up conclusions regarding conditions during the accident.

The program may also be configured to instruct the processing element of the user's mobile electronic device to analyze the incident data to determine a discrepancy. For instance, the program may be configured to compare portions of the incident data to identify conflicts, and/or to receive some of the incident data from the user interface and/or sensor and then access a database via the communication element to receive/verify data related to the received incident data. If there are discrepancies, the program may instruct the processing element to denote an inconsistency flag for that incident data on a structured incident data report (discussed in more detail below.

The program may also or alternatively instruct the processing element to overwrite portions of the incident data with portions of the related data in the memory element of the mobile electronic device and/or in the structured incident data report. For example, the program may instruct the processing element to determine whether there are portions of the related data without corresponding portions of the incident data. The program may instruct the processing element to write the related data into the structured incident data report where there is any such missing corresponding incident data. In an example, related data received from a server of an insurance provider may describe a claim made in the preceding month by the user for serious damage to his/her vehicle from an accident. Where a structured incident data report includes a "None" response to a data collection request asking the user to describe "Any recent incidents that may have led to a mechanical failure of an involved automobile," the program may be configured to insert a short reference to the prior accident within the structured incident data report in place of "None."

Alternatively or additionally, the program may automatically receive the incident data and respond to one or more of the data requests with the related data to obviate portions of the data inquiry set. For example, the program may instruct the processing element and the communication element to access a policyholder database and receive a policyholder data file having policy data related to an insurance policy of a policyholder. The policyholder data may be displayed on the user interface and/or be processed along with the incident data by the processing element to make determinations related to insurance coverage for the incident. The policyholder data may include the make and model of the policyholder's vehicle and therefore eliminate a data request for the make and model of the user's vehicle. The related data may also be used to inform a dynamic data inquiry set, such as, for example, changing the portions of the vehicles that the user is to photograph.

The program may instruct the processing element of the user's mobile electronic device to store each portion of the incident data with a reference indicating a corresponding data type collection request responsible for receipt of that portion of the incident data. To construct a structured incident data report as outlined above and using references to the portions of the incident data, the program may instruct the processing element to access a report template corresponding to the selected incident type. The report template may include a plurality of fields corresponding respectively to the references of the plurality of portions of the incident data. More particularly, portions of the report template may be embedded with the references and/or may be keyed to the corresponding data type collection request(s), permitting automated population of data fields of the report template with the corresponding portions of the incident data. It will be immediately understood by one of ordinary skill that a variety of approaches to keying and/or otherwise indexing portions of incident data to corresponding portions of a report template are within the scope of the present invention. The program may therefore instruct the processing element to access the stored incident data and generate a structured incident data report at least in part by locating the references in order to populate the plurality of fields with the stored incident data.

The program may also instruct the processing element of the user's mobile electronic device to prompt and receive confirmation of a desire to transmit the structured incident data report via the user interface. The program may further instruct the processing element to transmit, via the communication element, the structured incident data report to a server to initiate an accident claim process following confirmation. The program may instruct the processing element to encrypt the structured incident data report at any time, including for transmission and/or local storage. For example, the incident data report may proactively be stored in an encrypted file, and/or encrypted only prior to transmission.

Specific embodiments of the technology will now be described in connection with the attached drawing figures. The embodiments are intended to describe aspects of the invention in sufficient detail to enable those skilled in the art to practice the invention. Other embodiments may be utilized and changes may be made without departing from the scope of the present invention. The following detail description is, therefore, not to be taken in a limiting sense. The scope of the present invention is defined only by the appended claims, along with the full scope of equivalents to which such claims are entitled.

Exemplary Mobile Electronic Device

Figure 2:
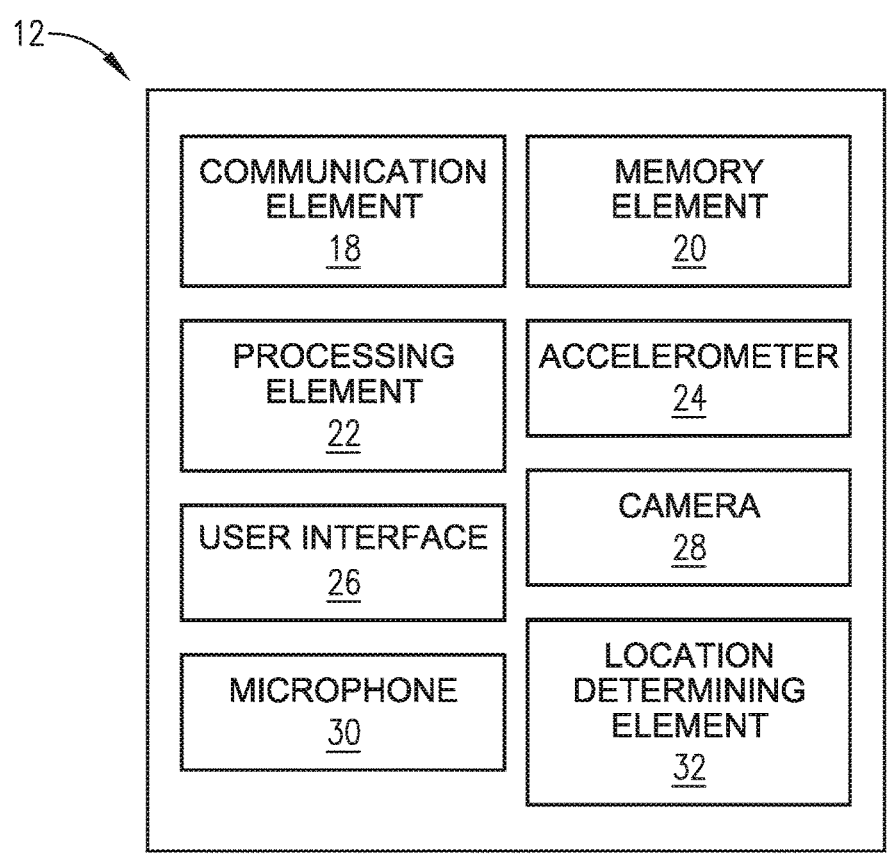
FIG. 2 illustrates various components of a mobile device of the exemplary system shown in block schematic form.

FIGS. 1 and 2 depict an exemplary mobile electronic device 12 for use in capturing incident data. The mobile electronic device 12 may be embodied by a smartphone, a tablet computer, a laptop computer, a phablet, smart glasses, a smart watch, wearable electronics, or the like, and may broadly comprise a communication element 18, a memory element 20, a processing element 22, a user interface 26, a location determining element 32, and one or more sensors such as an accelerometer 24, a camera 28, and/or a microphone 30. The communication element 18 may be configured to utilize radio frequency (RF) communication, such as cellular, WiFi, Bluetooth®, or the like, to communicate with other devices, systems, or networks.

The user interface 26 may have a display comprised of a video device of the following types: plasma, light-emitting diode (LED), organic LEI (OLED), Light Emitting Polymer (LEP) or Polymer LED (PLED), liquid crystal display (LCD), thin film transistor (TFT) LCD, LED side-lit or back-lit LCD, heads-up displays (HUDs), or the like, or combinations thereof. The user interface 26 may include a screen on which the information is presented, with the screen possessing a square or a rectangular aspect ratio that may be viewed in either a landscape or a portrait mode. In various embodiments, the user interface 26 may also include a touch screen occupying the entire screen or a portion thereof so that the screen functions as part of the user interface 26. The touch screen may allow the user to interact with the mobile electronic device 12 by physically touching, swiping, or gesturing on areas of the screen.

The user interface 26 generally allows the user to utilize inputs and outputs to interact with the mobile electronic device 12. Inputs may include buttons, pushbuttons, knobs, jog dials, shuttle dials, directional pads, multidirectional buttons, switches, keypads, keyboards, mice, joysticks, microphones, or the like, or combinations thereof. Outputs may include audio speakers, lights, dials, meters, printers, or the like, or combinations thereof. With the user interface 26, the user may be able to control the features and operation of the display. For example, the user may be able to zoom in and out on the display using either virtual onscreen buttons or actual pushbuttons. In addition, the user may be able to pan the image on the display either by touching and swiping the screen of the user interface 26 or by using multidirectional buttons or dials.

The location determining element 32 generally determines a current geolocation of the mobile electronic device 12 and may receive and process radio frequency (RF) signals from a global navigation satellite system (GNSS) such as the global positioning system (GPS) primarily used in the United States, the GLONASS system primarily used in regions formerly part of the Soviet Union, or the Galileo system primarily used in Europe. The location determining element 32 may accompany or include an antenna to assist in receiving the satellite signals. The antenna may be a patch antenna, a linear antenna, or any other type of antenna that may be used with location or navigation devices. The location determining element 32 may include satellite navigation receivers, processors, controllers, other computing devices, or combinations thereof, and memory. The location determining element 32 may process a signal, referred to herein as a "location signal", from one or more satellites that includes data from which geographic information such as the current geolocation is derived. The current geolocation may include coordinates, such as the latitude and longitude, of the current location of the mobile electronic device 12. The location determining element 32 may communicate the current geolocation to the processing element 22, the memory element 20, or both.

Although embodiments of the location determining element 32 may include a satellite navigation receiver, it will be appreciated that other location-determining technology may be used. For example, cellular towers or any customized transmitting radio frequency towers may be used instead of satellites may be used to determine the location of the mobile electronic device 12 by receiving data from at least three transmitting locations and then performing basic triangulation calculations to determine the relative position of the device with respect to the transmitting locations. With such a configuration, any standard geometric triangulation algorithm may be used to determine the location of the mobile electronic device. The location determining element 32 may also include or be coupled with a pedometer, accelerometer 24, compass, or other dead-reckoning components which allow it to determine the location of the device 12. The location determining element 32 may determine the current geographic location through a communications network, such as by using Assisted GPS (A-GPS), or from another electronic device. The location determining element 32 may even receive location data directly from a user.

The camera 28 may include standard cameras, as are known in the art, or other optical sensor and lens combinations capable of taking a picture or capturing an image. In various embodiments, the camera 28 may be integrated in the housing or body of the mobile electronic device 12. When a user captures a still image or otherwise generates imagery data, the camera 28 may store same in a data file, either in raw or compressed format, in the memory element 20.

The memory element 20 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 20 may be embedded in, or packaged in the same package as, the processing element 22. The memory element 20 may include, or may constitute, a "computer-readable medium," The memory element 20 may store the instructions, code, code segments, software, firmware, programs, applications, apps, services, daemons, or the like that are executed by the processing element 22. The memory element 20 may also be in electronic communication with the camera 28 and may store settings, data, metadata, documents, sound files, photographs, movies, images, databases, and the like. The processing element 22 may include electronic hardware components such as processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 22 may generally execute, process, or run instructions, code, code segments, software, firmware, programs, applications, apps, processes, services, daemons, or the like. The processing element 22 may also include hardware components such as finite-state machines, sequential and combinational logic, and other electronic circuits that may perform the functions necessary for the operation of the current invention. The processing element 22 may be in communication with the other electronic components through serial or parallel links that include address busses, data busses, control lines, and the like. The processing element may be in electronic communication with the communication element 18, the memory element 20, the accelerometer 24, the user interface 26, the camera 28, the microphone 30, and/or the location determining element 32.

The processing element 22 may be programmed or configured, via hardware, software, firmware, or combinations thereof, to perform the following functions. The processing element 22 may be configured to receive a start data collection request from a user interface of the mobile electronic device. The start data collection request may be received via the user interface 26, the microphone 30, the communication element 18, and/or other inputs that are indicative of an incident, such as a change in speed detected by the accelerometer 24.

Once the start data collection request is received, the processing element 22 may be configured to receive a selection, via the user interface 26, of an incident type of an automatically populated set of incident types. The automatically populated set of incident types may be a list of incident types populated and optionally periodically updated by an insurance provider, artificial intelligence and/or the program based on several considerations. The considerations may be laws of a state in which the user is a resident, laws of a state in which the incident occurred, information about the user, information about the user's insurance policy, current location as detected by the location determining element 32, etc.

Upon determining the incident type, the processing element 22 may be configured to access a database storing a plurality of predetermined data inquiry sets. Each data inquiry set may define at least one predetermined data type collection request corresponding to an incident type of the automatically populated set of incident types. The processing element 22 may then compare the selected incident type against the plurality of data inquiry sets to determine a matched data inquiry set for the incident type. In an embodiment, the matched data inquiry set may comprise a static set of prompts/data collection requests configured to elicit certain user input(s) comprising incident data. The data collection requests of a matched data inquiry set may also or alternatively be dynamically determined. The matched data inquiry set may be a combination of both static and dynamically-determined prompts/data collection requests.

The processing element 22 may also be configured to access a database storing related data. The processing element 22 may provide incident data, identification data, and/or credentials to receive access permission. Once received, the processing element 22 may request related data associated with the user or associated with other incident data and/or data responsive to the matched data inquiry set.

Once the matched data inquiry set is determined, the processing element 22 may display the at least one predetermined data type collection request of the matched data inquiry set on the user interface 26 and receive incident data in response to the at least one predetermined data type collection request. In an embodiment, the user interface 26 may be configured to receive incident data comprising manual input of the user. Alternatively or additionally, the processing element 22 may be configured to receive the incident data via other inputs received from, for example, the camera 28, the microphone 30, the accelerometer 24, and/or the communication element 18. The processing element 22 may also be configured to utilize optical character recognition (OCR) and/or object recognition software to analyze images for additional incident data. Moreover, the processing element 22 may be configured to generate metadata from incident received. The processing element 22 may also be configured to analyze some of the received incident data to determine a discrepancy, identify conflicts, and/or verify data related to the received incident data.

Once the incident data is received, the processing element 22 may be configured to store the received incident data.

Each portion of the incident data may be stored with a reference indicating a corresponding data type collection request responsible for receipt of that portion of the incident data.

Exemplary System

FIG. 1 depicts an exemplary environment in which embodiments of a system 10 may be utilized for guiding and aiding a user in collecting information relevant to an insurance claim. The environment may include the mobile electronic device 12, a network 14 accessible by the mobile electronic device 12, and one or more computer servers 16 coupled to the network 14.

The network 14 may generally allow communication between the mobile electronic device 12 and the server 16. The network 14 may include local area networks, metro area networks, wide area networks, cloud networks, the Internet, cellular networks, plain old telephone service (POTS) networks, and the like, or combinations thereof. The network 14 may be wired, wireless, or combinations thereof and may include components such as modems, gateways, switches, routers, hubs, access points, repeaters, towers, and the like. The mobile electronic device 12 generally connects to the network 14 wirelessly, such as radio frequency (RF) communication using wireless standards such as cellular 2G, 3G, or 4G, Institute of Electrical and Electronics Engineers (IEEE) 802.11 standards such as IEEE 802.16 standards such as WiMAX, Bluetooth®, or combinations thereof.

Turning to the server 16 of embodiments of the present invention, such a server 16 may be embodied by one or more application servers, database servers, file servers, gaming servers, mail servers, print servers, web servers, or the like, or combinations thereof. Furthermore, the server 16 may include a plurality of servers, virtual servers, or combinations thereof. The server 16 may be configured to include or execute computer programs and software such as file storage applications, database applications, email or messaging applications, web server applications, or the like, in addition to and/or in conjunction with the computer program and/or software described elsewhere herein (e.g., the source application, the integration application, and/or the inflation application).

The server 16 may include a communication element, a memory element, and a processing element (not shown). The communication element generally allows communication with external systems or devices (such as the mobile electronic device 12) and/or between one or more individual servers. The communication element may include signal or data transmitting and receiving circuits, such as antennas, transceivers, amplifiers, filters, mixers, oscillators, digital signal processors (DSPs), and the like. The communication element may establish communication wirelessly by utilizing RF signals and/or data that comply with communication standards such as cellular 2G, 3G, 4G, 5G, or LIE, IEEE 802.11 standard such as Win, IEEE 802.16 standard such as WiMAX, Bluetooth®, or combinations thereof. Alternatively, or in addition, the communication element may establish communication through connectors or couplers that receive metal conductor wires or cables which are compatible with networking technologies such as ethernet. In certain embodiments, the communication element may also couple with optical fiber cables. The communication element may be in communication with or electronically coupled to memory element and/or processing element.

The memory element may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory element may include, or may constitute, a "computer-readable medium". The memory element may store the instructions, code, code segments, software, firmware, programs, applications, apps, services, daemons, or the like that are executed by the processing element. The memory element may also store settings, data, documents, sound files, photographs, movies, images, databases, and the like.

The processing element may include processors, microprocessors, microcontrollers, DSPs, field-programmable gate arrays (FPGAs), analog and/or digital application-specific integrated circuits (ASICs), or the like, or combinations thereof. The processing element may generally execute, process, or run instructions, code, code segments, software, firmware, programs, applications, apps, processes, services, daemons, or the like. The processing element may also include hardware components, such as finite-state machines, sequential and combinational logic, and other electronic circuits that may perform the functions necessary for the operation of embodiments of the current inventive concept. The processing element may be in communication with the other electronic components through serial or parallel links that include address busses, data busses, control lines, and the like.

The server 16 may be configured to receive the information from the user via the network 14. The server 16 may be configured to automatically analyze the information to determine insurance policy coverage, accident fault, fraudulent filing, extent of damage, estimated repair costs, etc. The server 16 may be configured to then transmit some or all of this information to the mobile device 12 of the user via the network 14.

Exemplary Computer-Implemented Method

Figure 12:
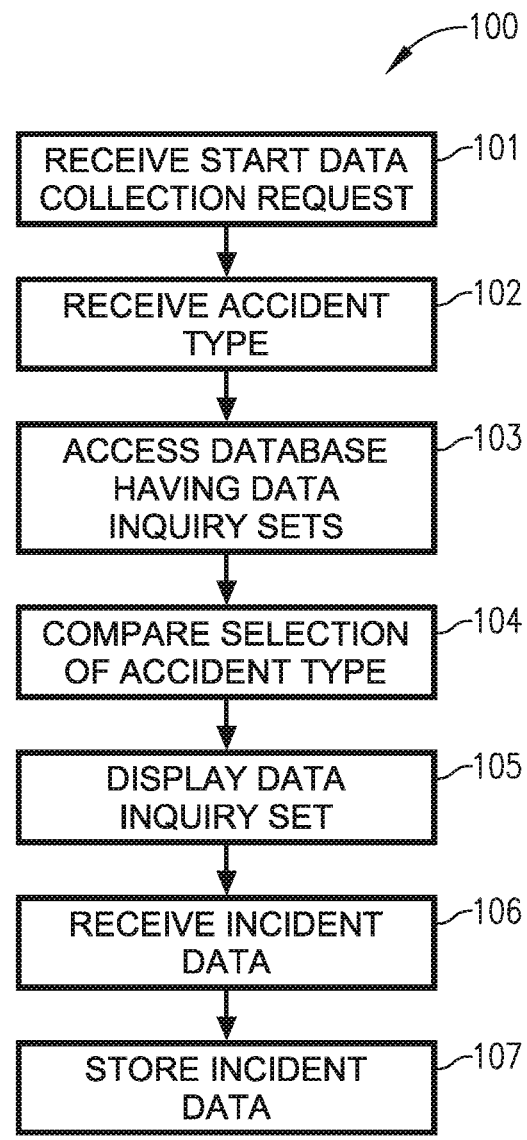
FIG. 12 illustrates at least a portion of the steps of an exemplary computer-implemented method for gathering information relevant to an insurance claim.

FIG. 12 depicts a listing of steps of an exemplary computer-implemented method 100 for collecting and transmitting information relevant to an insurance claim for a vehicle incident. The steps may be performed in the order shown in FIG. 12, or they may be performed in a different order. Furthermore, some steps may be performed concurrently as opposed to sequentially. In addition, some steps may be optional.

The computer-implemented method 100 is described below, for ease of reference, as being executed by exemplary devices and components introduced with the embodiments illustrated in FIGS. 1 and 2. For example, the steps of the computer-implemented method 100 may be performed by the mobile device 12, the server 16, and the network 14 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable mediums) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Figure 3:
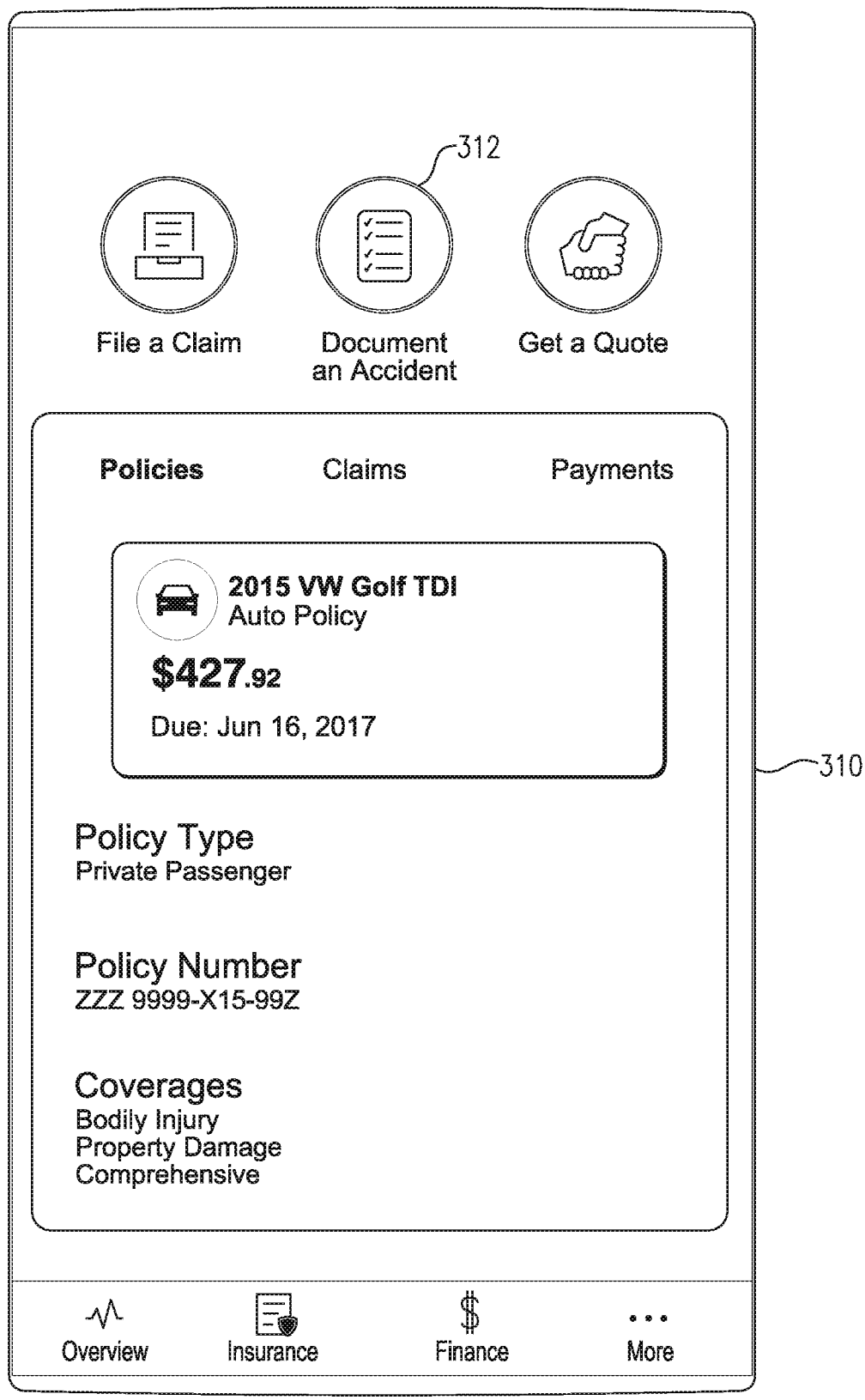
FIG. 3 illustrates various components of an exemplary user interface according to embodiments of the present inventive concept.

Referring to step 101, a start data collection request may be received via a user interface. FIG. 3 shows an exemplary user interface 310 for receiving the start data collection request embodied as a touch screen button 312. The start data collection request may be received as user input via the user interface. The start data collection request may also be received as user input via a microphone sensor of the mobile electronic device, for example where embodied by a verbal command, instruction, notice, etc. referencing the occurrence of an incident or otherwise indicating a start data collection request. For example, the program may be pre-programmed to treat the spoken phrase "begin accident data collection" as the start data collection request, whereupon the user could access a mobile electronic device assistant via voice command and speak the aforementioned phrase to initiate data collection processes.

In an embodiment, the start data collection request may partly or completely comprise input other than user input. The program may be configured to treat data received from a sensor and/or third-party device(s) and/or databases as the start data collection request. For instance, sensor data from an accelerometer of the user mobile device may indicate the occurrence of a collision. Other sensor data from the microphone of the mobile device may receive and interpret audio representing human voices speaking without strain or stress. This combined sensor data, together with a determination that the collision occurred recently and/or that the user is still in the vicinity of the collision (according to GPS data), may comprise the start data collection request recognized by the program to initiate automated data collection guidance.

In an embodiment, the start data collection request may also be received via a communication element of the mobile electronic device. For example, the mobile electronic device may receive a text, email, message, or the like, via the communication element, containing data (e.g., words) that the program is pre-configured to treat as a start data collection request.

The automated data collection guidance may be initiated according to the steps outlined herein or according to other actions and/or messages/input. For instance, a link, and/or file may be received through a text, email, message or the like, via the communication element, and the link being configured to automatically install the program and initiate the automated data collection guidance steps. It should also be noted that a different start data collection request may be generated for each incident. It is foreseen that a program may be configured to automatically recognize a variety of triggers to initiate automated data collection guidance steps without departing from the spirit of the present invention. The database containing the start data collection request, and data related thereto, may be stored on the memory element of the mobile device, though it is foreseen that it may be stored on other computing devices of a system without departing from the spirit of the present invention.

Figure 4:
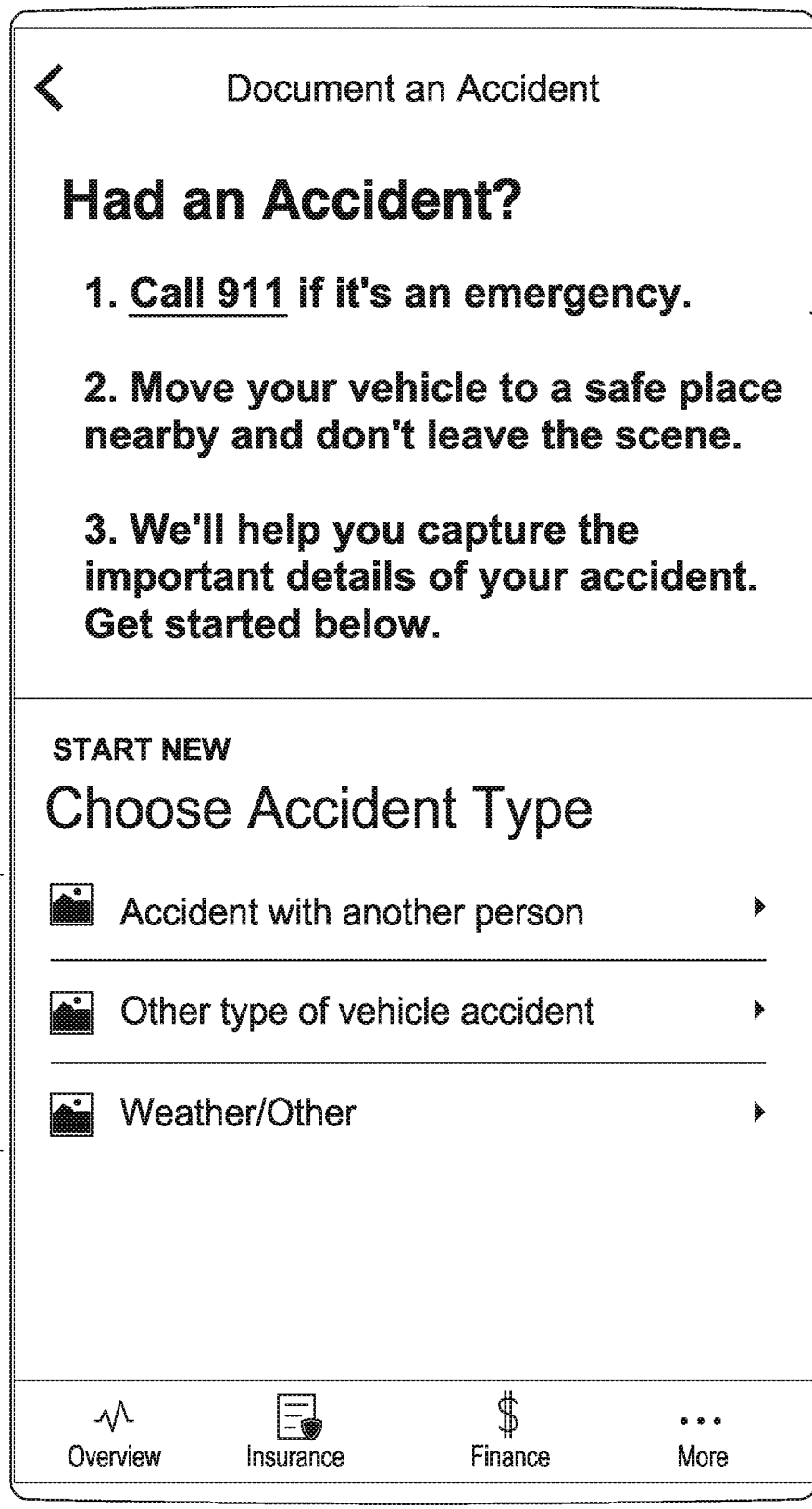
FIG. 4 illustrates various components of an exemplary user interface according to embodiments of the present inventive concept.

Referring to step 102, following initiation of automated data collection guidance, an incident type may be received, for example via receipt of user input comprising selection of an incident type from an automatically populated set of incident types presented by instruction of the program. FIG. 4 depicts an exemplary user interface 410 displaying an automatically populated set of incident types 412. The automatically populated set of incident types 412 may be a list of incident types populated and optionally periodically updated by an insurance provider, artificial intelligence and/or the program. The automatically populated set 412 may be populated based on consideration of laws of a state in which the user is a resident, laws of a state in which the incident occurred, information about the user, information about the user's insurance policy, etc.

GPS or similar data may be periodically or constantly accessed and/or received from a location determining element of the user's mobile electronic device and may generate the list of incident types based at least in part on such data following an incident. In some embodiments, incident data, such as a description of the incident, may be received from the user, analyzed, and used to select the incident type from the automatically populated set. It is foreseen that various dynamic and static information may be relied upon to inform generation of the list of incident types with respect to each particular incident without departing from the spirit of the invention.

An automatically populated set of incident types presented to a user may include very broad categories, such as, for example, a single vehicle incident category and a multiple vehicle incident category. Other exemplary categories may include incident types such as a theft incident and/or a weather-related incident, which may be treated independently as broad categories or as sub-categories following selection of a broader category such as single/multiple vehicle incident categories. Any combination or number of incident type categories and/or sub-categories may comprise an automatically populated set. The database containing the automatically populated set of incident types, and data related thereto, may be stored on the memory element of the mobile device, though it is foreseen that it may be stored on other computing devices of a system without departing from the spirit of the present invention.

Referring to step 103, once an incident type is determined, a database storing a plurality of predetermined data inquiry sets may be accessed via the processor and/or communication element of the user's mobile electronic device. Each data inquiry set may define at least one predetermined data type collection request corresponding to an incident type of the automatically populated set of incident types. One incident type may require data collected regarding multiple subjects and/or collected via multiple input types; thus, one or more data type collection requests may be required for a certain incident type. For example, the data type collection requests may relate to portions of the incident data, the policyholder, and/or data received by the mobile electronic device via the communication element (e.g., data from other devices with which the user's mobile electronic device is in communication). The database containing the plurality of predetermined data inquiry sets, and data related thereto, may be stored on the memory element of the mobile device, though it is foreseen that it may be stored on other computing devices of a system without departing from the spirit of the present invention.

Referring to step 104, the selected incident type is compared against the plurality of data inquiry sets to determine a matched data inquiry set for the selection. In an embodiment, the matched data inquiry set may comprise a static set of prompts/data collection requests configured to elicit certain user input(s) comprising incident data. The data collection requests of a matched data inquiry set may also or alternatively be dynamically determined, for example where the program includes an algorithm for analyzing one or more portions of the incident data in order to select and shape presentation of remaining data collection requests of the matched data inquiry set. The matched data inquiry set may be a combination of both static and dynamically-determined prompts/data collection requests. For example, a dynamic algorithm may generate a prompt/data collection request displayed to the user asking for input of a number of vehicles involved in an incident; thereafter, depending on the number of vehicles entered, the algorithm may dynamically generate a follow-up data collection request for specific incident data about each vehicle involved.

A dynamic algorithm and/or incident data processed by the dynamic algorithm may be executed and/or collected locally, e.g., on the user mobile electronic device. It is also foreseen that the transmission of portions of incident data may be directed to remote computing device(s)—e.g., to a remote server—to receive data and/or data collection request(s) to inform presentation of the remaining data collection requests of a matched data inquiry set without departing from the spirit of the present invention.

Figure 5:
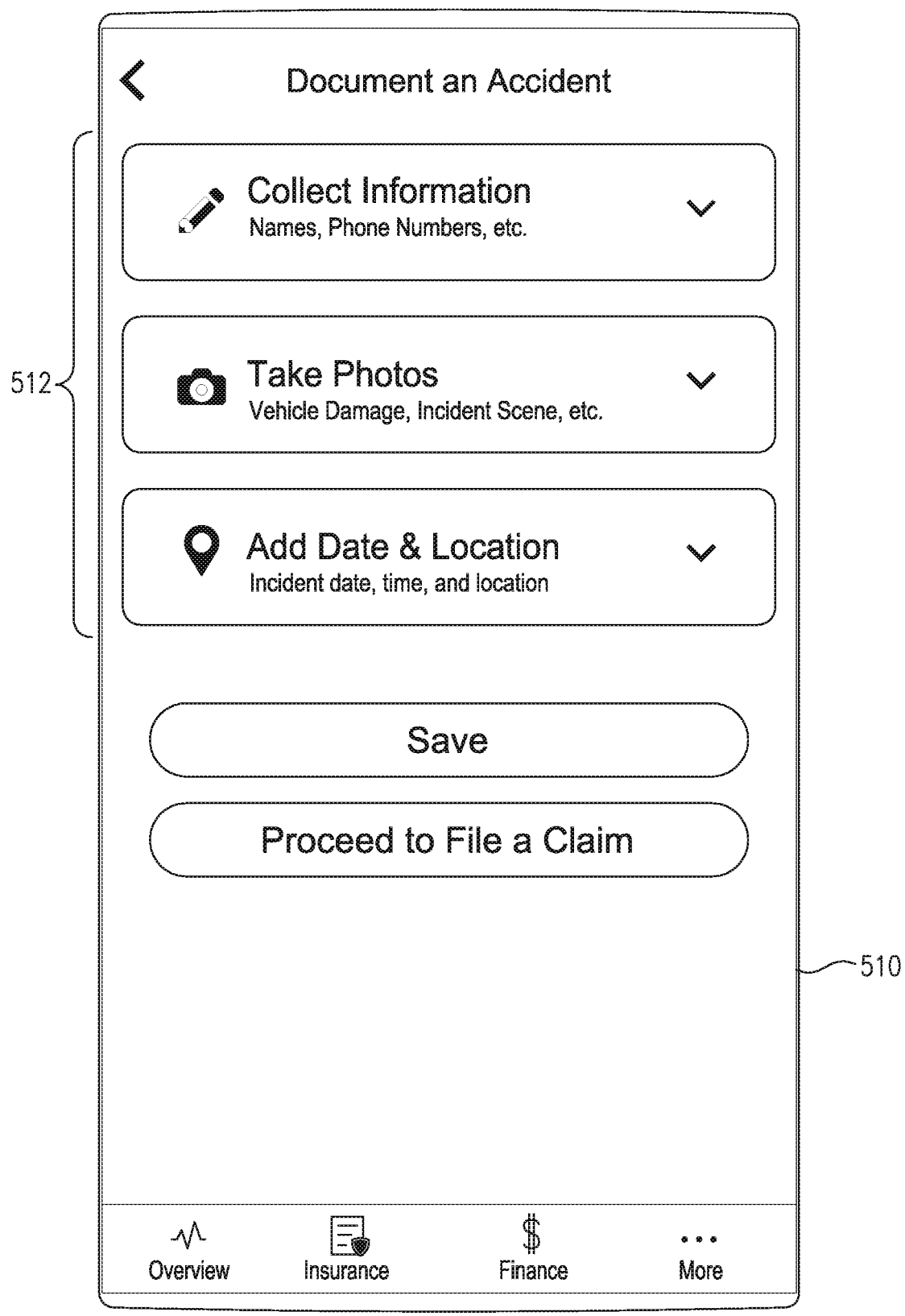
FIG. 5 illustrates various components of an exemplary user interface according to embodiments of the present inventive concept.
Figure 6:
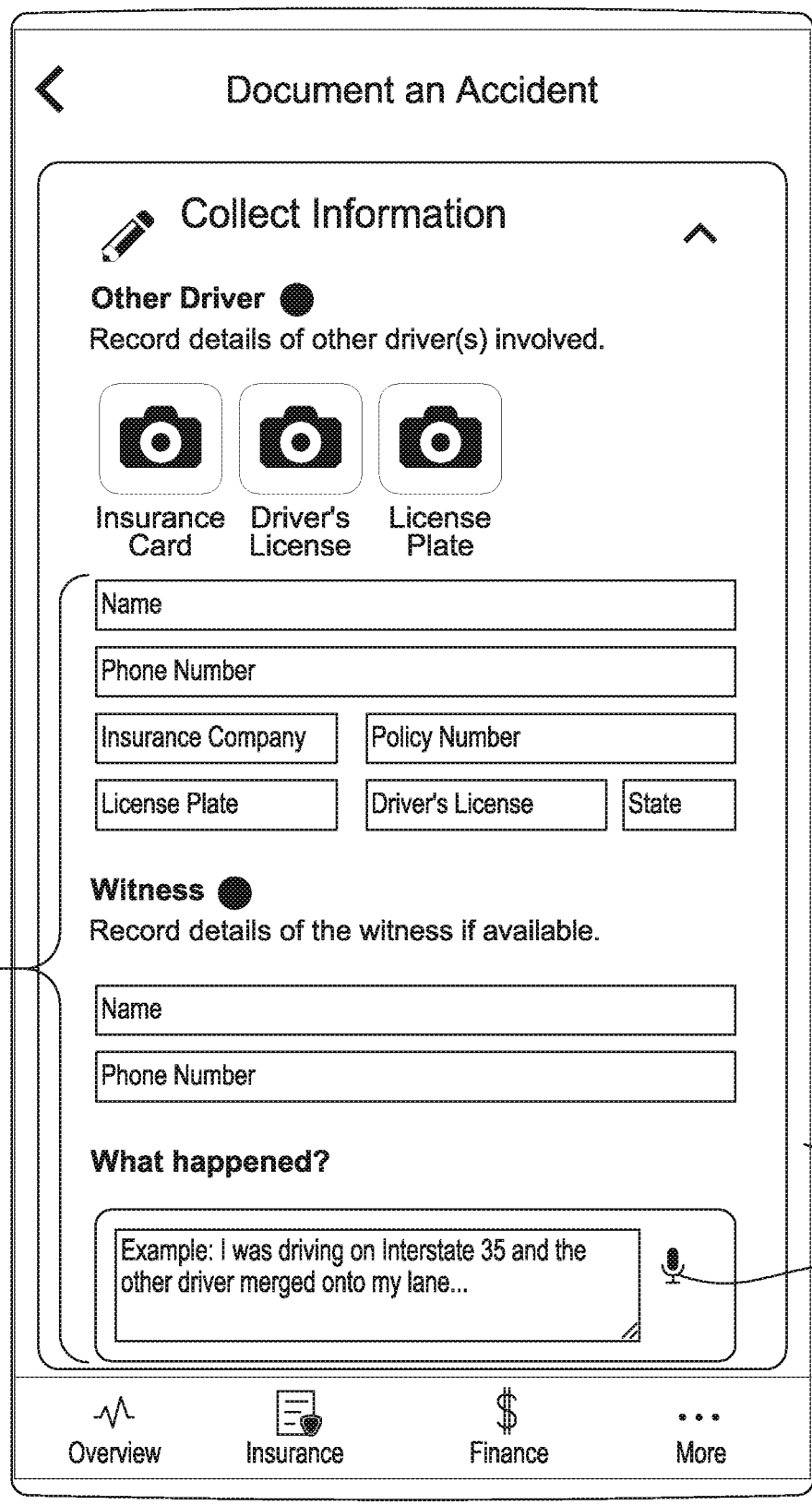
FIG. 6 illustrates various components of an exemplary user interface according to embodiments of the present inventive concept.

Referring to step 105, at least one predetermined data type collection request of the matched data inquiry set is displayed via the user interface. FIGS. 5-9 depict exemplary user interfaces displaying matched data inquiry sets. In some embodiments, the matched data inquiry set is displayed as a plurality of fields on the user interface for entering incident data. FIG. 5 depicts an exemplary user interface 510 displaying a data inquiry set 512 partitioned into three categories: text information to be received via the user interface, imagery to be received via the camera, and date and location data to be received via data feeds such as a GPS, an internal clock, etc. FIG. 6 depicts an exemplary user interface 610 displaying the plurality of data fields 612.

Referring to step 106, in response to the data collection request(s) of the matched data inquiry set, incident data is received, for example, via at least one of the user interface, a sensor, and a communication element. In an embodiment, incident data comprising manual input of the user may be received via the user interface. Alternatively or additionally, incident data may be received via the sensor. The sensor may be any sensor known in the art including a light sensor such as a camera, an audio sensor such as a microphone, an accelerometer, etc.

Figure 7:
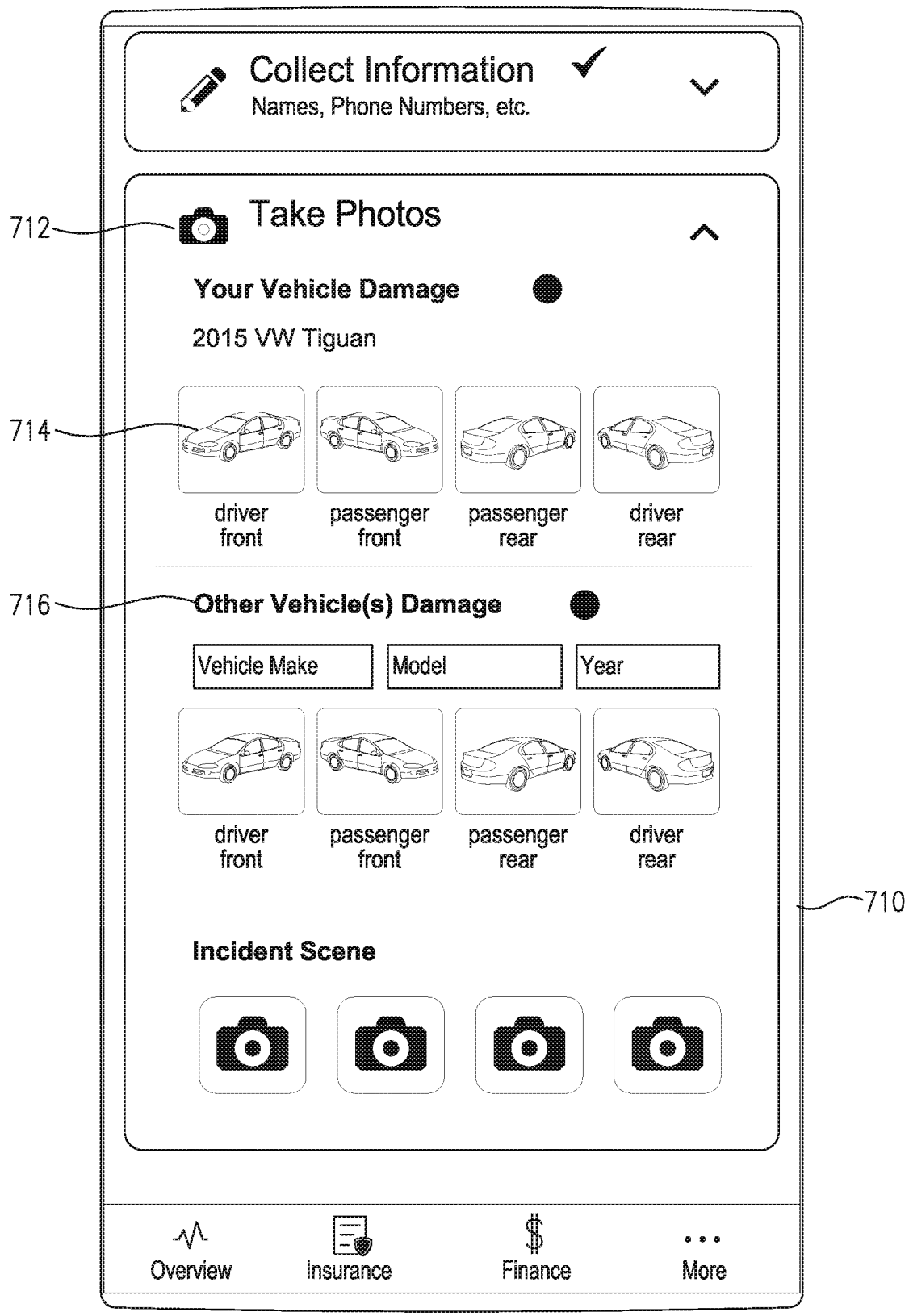
FIG. 7 illustrates various components of an exemplary user interface according to embodiments of the present inventive concept.

Exemplary data collection requests and corresponding received incident data may take any of a variety of forms. For instance, a data collection request may comprise a request for the user to capture sensor data, for instance by taking a picture with a photographic element of the user mobile electronic device. In connection therewith, an immediate reference image may be displayed via the user interface. The immediate reference image may be a user-friendly, highly-readable graphical display of post-accident instructions, FIG. 7 depicts an exemplary user interface 710 displaying a plurality of views of a vehicle that the user is requested to emulate in collecting incident data using the photographic element of the user mobile electronic device. For instance, a data collection request 712 for a picture of a front-left portion of the user's vehicle may include an immediate reference image 714 displayed at the user interface 710 and comprising a generic drawing of a front-left portion of a vehicle. Where exemplary drawings and/or photographs more representative of the user's specific vehicle are available for use, a corresponding immediate reference image may include same. One of ordinary skill will immediately appreciate that a wide variety of requests and visual and/or audio aides may be incorporated into data collection requests within the scope of the present invention.

Figure 8:
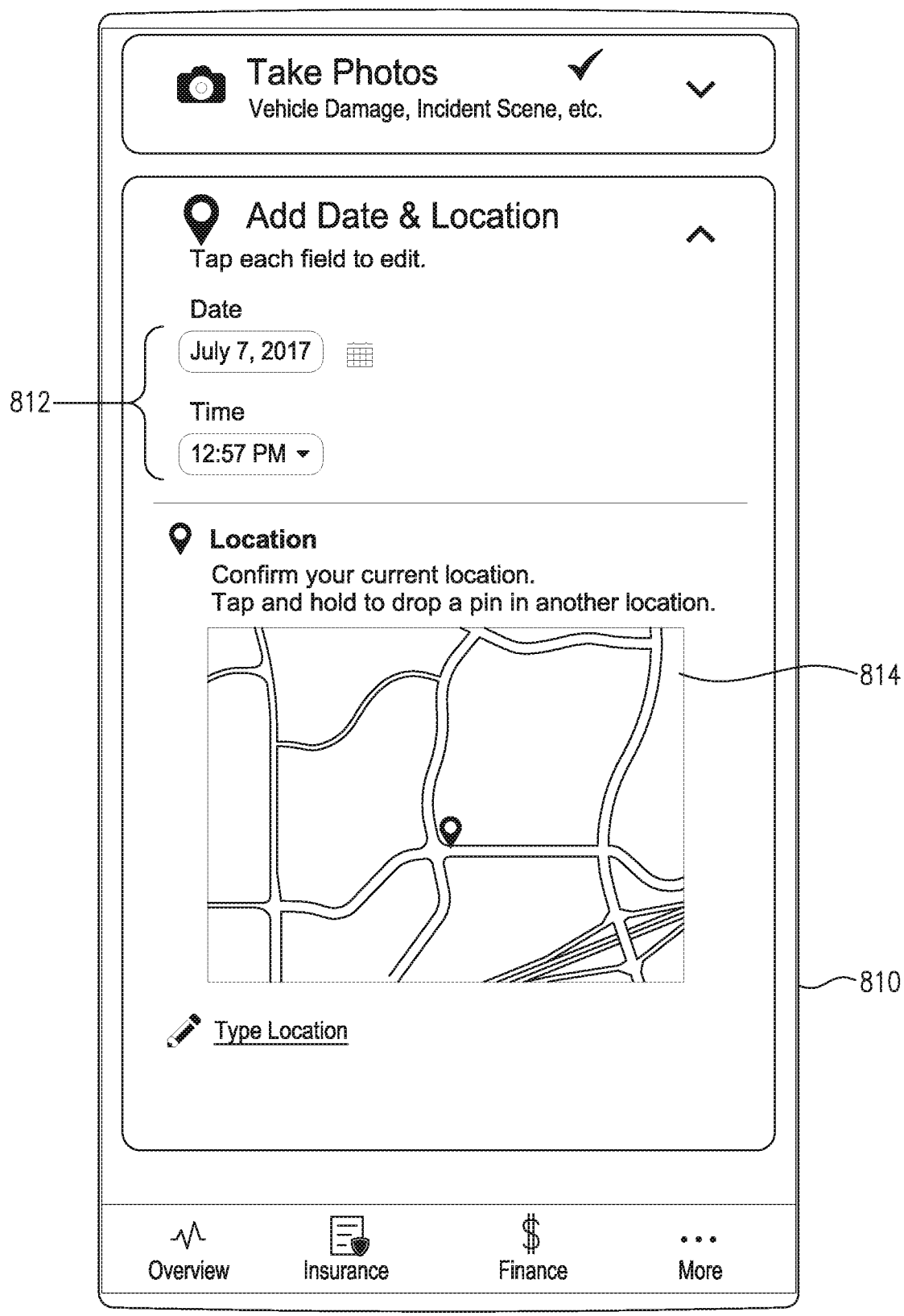
FIG. 8 illustrates various components of an exemplary user interface according to embodiments of the present inventive concept.

Data collection requests for pictures of other objects or aspects of the accident scene and/or involved entities may also be displayed. For instance, as shown in FIG. 7, the program may be configured to generate a data collection request 716 for one or more photographs of another vehicle involved in the accident. Further, FIG. 8 depicts an exemplary user interface 810 having data fields 812 for receiving incident data related to the date and time of the incident. The user interface 810 also includes an interactive map 814 for receiving incident data related to the location of the incident, such as GPS coordinates or other coordinates representative of the location.

In an embodiment, incident data may be received using the microphone and stored as an audio file, and/or as a text file generated using talk to text software, on the memory element of the user's mobile electronic device. For example, audio data may be collected that relates to sounds generated by an incident, names of individuals involved in the incident, statements from parties involved in the incident, and/or statements from witnesses. The user interface 610 of FIG. 6 depicts an exemplary icon 614 for initiating a recording function for receiving audio input comprising a statement from a witness.

Incident data may also be received via the communication element such as through near-field communication (NFC), Bluetooth®, or the like. The communication element may receive incident data from a text message, email, message on a messaging application, or a messaging feature built in the program. The communication may include any relevant incident data and be in any form such as text, audio, or images. For example, the communication element may be configured to receive incident data about a party involved in the accident directly from that party via the communication element. Data received via the communication element may also or alternatively include telematics data collected via one or more involved vehicles, weather data collected via third party database(s), policyholder data received via one or more servers of an insurance provider, and any other type of data that may be useful in completing responses to the data collection request(s). The communication element may receive GPS data, which may be utilized to determine a location of collection of incident data, such as geolocation coordinates stored as metadata for an image. Moreover, such GPS data may be used to verify the validity of incident data received from third-party devices. For instance, where incident data is received from a third-party device, location data (e.g., address, digital mapping, and/or GPS data) for the third-party device leading up to and immediately following the implicated incident may be compared against location data for the user and/or the user's mobile device recorded in association with the incident to provide partial or complete validation of the third-party incident data.

In an embodiment, a database may also be accessed via the processing element and/or communication element, and related data may be received. The related data (e.g. policyholder data) may be displayed on the user interface of the user's mobile electronic device and/or be processed along with the incident data by the processing element to make determinations related to insurance coverage for the incident. Such determinations may be displayed on the user interface. FIG. 11 depicts an exemplary user interface 1110 displaying text boxes 1112 having determinations related to insurance coverage.

Incident data received according to one or more steps outlined above may be further processed, subsequent to and/or in connection with the presentation of data collection requests and incident data collection. For example, OCR and/or object recognition software may be used to analyze images to produce additional incident data. In an embodiment, the user may be directed to capture images of one or more third-party driver documents via the camera of the user's mobile electronic device and may execute OCR software to recognize text on the images for storage and/or inclusion in a structured incident data report or the like. More particularly, images of an insurance card, driver's license, and/or license plate may be requested, received, and utilized via OCR to determine phone number, legal name, driver's license number, state of licensure, license plate number, insurance company, policy number and/or other information from the image(s).

In an embodiment, incident data identifying a state of licensure for a driver (e.g., a third-party driver) may be collected. Further a database containing information and/or metadata regarding official state documents may be consulted. Such information may, for example, identify layouts (e.g., borders, landmarks such as required text with predetermined placement, etc.) of the states' official documents to help identify information and/or portions of the image to capture and/or classify. Additionally or in the alternative, OCR algorithm(s) may be utilized to identify and classify information and/or portions of the image containing certain objects (e.g., a photograph of the driver, damaged portions of a vehicle, etc.). Information related to the make, model, and/or year of vehicles involved in and/or proximate the accident may also be determined for example, using object recognition software—and/or received. In this manner, portions of documents or other objects, items and/or people from an image captured by the user's mobile electronic device and/or third-party devices may be recognized, captured, and/or recorded.

Moreover, metadata may be generated from photographs of the accident scene and/or of relevant objects, for example to automatically determine the location and time of the incident, the weather during or soon after the accident, or to otherwise generate information that may be relevant to processing of insurance claims. Metadata and/or data extrapolated therefrom and/or from images captured by the sensor of the user's and/or a third party's mobile electronic device(s) may be combined with data from external sources (including related data discussed below) e.g., data from third party databases and/or from telematics devices of one or more vehicles—to automatically generate additional data that may be relevant to an insurance claims process. For instance, where weather conditions may be relevant to a fault analysis, photographs of the conditions at the scene immediately following the accident may be reconciled against weather database data to identify discrepancies and/or firm up conclusions regarding conditions during the accident.

Figure 9:
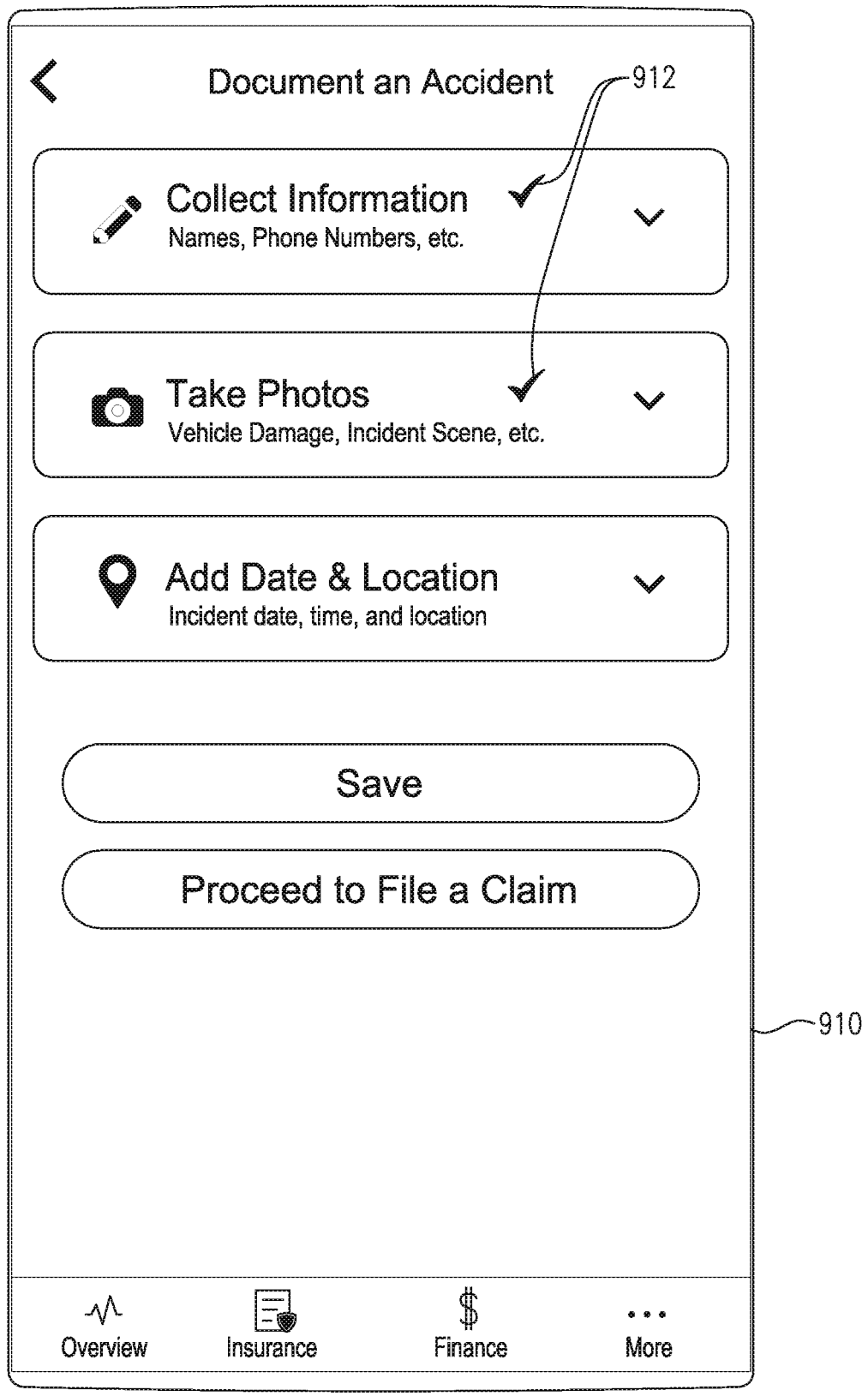
FIG. 9 illustrates various components of an exemplary user interface according to embodiments of the present inventive concept.

Incident data and related data may also be analyzed, via the processing element, to determine an inconsistency. For instance, portions of incident data may be analyzed to determine relative responsiveness to particular categories of the data inquiry set. An indication may be provided via the user interface when a category of the data inquiry set has received sufficient incident data or incident data in conflict with related data. FIG. 9 depicts an exemplary user interface 910 having an indicator 912 adjacent to a category of a data inquiry set, which indicates that category has received sufficient incident data. Further, portions of the incident data may be compared with related data to identify conflicts, and/or some of the incident data may be received from the user interface and/or sensor and then a database may be accessed, via the communication element, to receive/verify data related to the received incident data. If there are discrepancies, an inconsistency flag may be denoted for that incident data on a structured incident data report (discussed in more detail below).

Portions of the incident data may be overwritten with portions of the related data in the memory element of the mobile electronic device and/or in the structured incident data report. For example, it may be determined whether there are portions of the related data without corresponding portions of the incident data. Related data may be written into the structured incident data report where there is any such missing corresponding incident data. In an example, related data received from a server of an insurance provider may describe a claim made in the preceding month by the user for serious damage to his/her vehicle from an accident. Where a structured incident data report includes a "None" response to a data collection request asking the user to describe "Any recent incidents that may have led to a mechanical failure of an involved automobile," a short reference may be inserted into the prior accident within the structured incident data report in place of "None."

Figure 10:
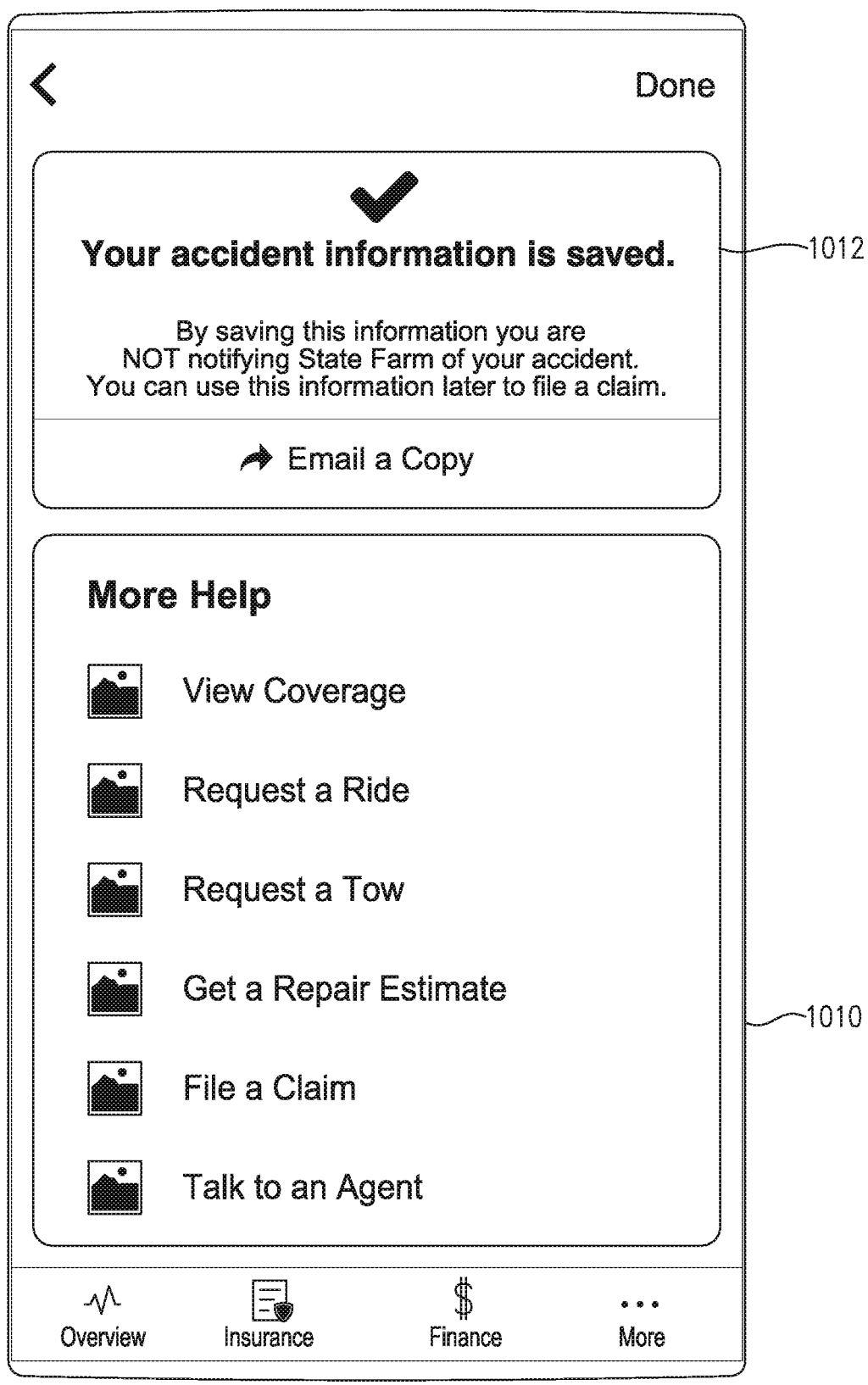
FIG. 10 illustrates various components of an exemplary user interface according to embodiments of the present inventive concept.

Referring to step 107, once incident data is received, it and/or the related data and any inconsistencies may be stored via the processor. A notification of successful storage may be displayed via the user interface. FIG. 10 depicts an exemplary user interface 1010 having such a notification 1012. Each portion of the incident data may be stored with a reference indicating a corresponding data type collection request responsible for receipt of that portion of the incident data. To construct a structured incident data report as outlined above and using references to the portions of the incident data, a report template corresponding to the selected incident type may be accessed. The report template may include a plurality of fields corresponding respectively to the references of the plurality of portions of the incident data. More particularly, portions of the report template may be embedded with the references and/or may be keyed to the corresponding data type collection request(s), permitting automated population of data fields of the report template with the corresponding portions of the incident data. It will be immediately understood by one of ordinary skill that a variety of approaches to keying and/or otherwise indexing portions of incident data to corresponding portions of a report template are within the scope of the present invention. The stored incident data may therefore be accessed, and a structured incident data report may be generated at least in part by locating the references in order to populate the plurality of fields with the stored incident data. The database containing incident data, and data related thereto, may be stored on the memory element of the mobile device, though it is foreseen that it may be stored on other computing devices of a system without departing from the spirit of the present invention.

Confirmation of a desire to transmit the structured incident data report may be prompted and received via the user interface. The program may further instruct the processing element to transmit, via the communication element, the structured incident data report to a server to initiate an accident claim process following confirmation. The program may instruct the processing element to encrypt the structured incident data report at any time, including for transmission and/or local storage. For example, the incident data report may proactively be stored in an encrypted file, and/or encrypted only prior to transmission.

Exemplary System Comprising Computer-Readable Media for Capturing Vehicle Incident Data In another aspect, a system comprising computer-readable media for capturing vehicle incident data may be provided. The system may include a computer-readable medium including an executable program stored thereon, wherein the program instructs a processing element of a mobile electronic device to perform the following steps: (1) receive a start data collection request from a user interface of the mobile electronic device; (2) receive a selection of an incident type from an automatically populated set of incident types from the user interface; (3) access a database storing a plurality of predetermined data inquiry sets, each data inquiry set defining at least one predetermined data type collection request corresponding to an incident type of the automatically populated set of incident types; (4) compare the selection against the plurality of data inquiry sets to determine a matched data inquiry set for the selection; (5) display the at least one predetermined data type collection request of the matched data inquiry set on the user interface; (6) receive incident data in response to the at least one predetermined data type collection request; (7) receive related data; (8) compare the incident data and the related data to determine at least one inconsistency; and (9) store the received incident data, portions of the related data, and the at least one inconsistency. The programs stored on the computer-readable media may instruct the processing elements to perform additional, fewer, or alternative actions, including those discussed elsewhere herein.

A vehicular accident insurance claim is generally filed soon after the accident. Such accidents may be of multiple types, including multiple vehicle accidents, single vehicle accidents, weather-related accidents, etc. When an insured files a claim, it is generally required for an insurer to gather information about covered damaged property, which may include recording information about the damages that will help in generating subsequent analyses and estimates.

The incident data may be information about one or more third-party drivers if a third party was involved such as name, phone number, insurance company, policy number, license plate, driver's license number, state that issued the driver's license, images of official documents (e.g., insurance card, driver's license, license plate), witnesses, witness names, witness phone numbers, witness statements, audio files and/or text files (generated using talk-to-text software) of witness statements, images of the user's car and images of any other car involved, makes of the relevant cars, models of the relevant cars, year of manufacture of the relevant cars, images of the incident scene, metadata generated from the images (such as location and time of the incident), data related to weather during the accident, live data feeds (such as weather, temperature, speed, GPS coordinates, etc.), and the location, date, and time of the incident, etc.

Embodiments of the present invention provide improved, automated technologies for guiding an insured user through gathering incident data and claim initiation processes in a manner that preserves valuable and comprehensive data and increases efficiencies of the user and the insurer. More particularly, such automated technologies may include a mobile electronic device of the user that executes a program for capturing incident data.

The program may instruct a processing element of the mobile electronic device to: (1) receive a start data collection request from a user interface of the mobile electronic device; (2) receive a selection of an incident type from an automatically populated set of incident types from the user interface; (3) access a database storing a plurality of predetermined data inquiry sets, each data inquiry set defining at least one predetermined data type collection request corresponding to an incident type of the automatically populated set of incident types; (4) compare the selection against the plurality of data inquiry sets to determine a matched data inquiry set for the selection; (5) display the at least one predetermined data type collection request of the matched data inquiry set on the user interface; (6) receive incident data in response to the at least one predetermined data type collection request; (7) receive related data; (8) compare the incident data and the related data to determine at least one inconsistency; and (9) store the received incident data, portions of the related data, and the at least one inconsistency.

The start data collection request may be received as user input via the user interface. The start data collection request may also be received as user input via a microphone sensor of the mobile electronic device, for example where embodied by a verbal command, instruction, notice, etc. referencing the occurrence of an incident or otherwise indicating a start data collection request. For example, the program may be pre-programmed to treat the spoken phrase "begin accident data collection" as the start data collection request, whereupon the user could access a mobile electronic device assistant via voice command and speak the aforementioned phrase to initiate data collection processes.

In an embodiment, the start data collection request may partly or completely comprise input other than user input. The program may be configured to treat data received from a sensor and/or third-party device(s) and/or databases as the start data collection request. For instance, sensor data from an accelerometer of the user mobile device may indicate the occurrence of a collision. Other sensor data from the microphone of the mobile device may receive and interpret audio representing human voices speaking without strain or stress. This combined sensor data, together with a determination that the collision occurred recently and/or that the user is still in the vicinity of the collision (according to GPS data), may comprise the start data collection request recognized by the program to initiate automated data collection guidance.

In an embodiment, the start data collection request may also be received via a communication element of the mobile electronic device. For example, the mobile electronic device may receive a text, email, message, or the like, via the communication element, containing data (e.g., words) that the program is pre-configured to treat as a start data collection request.

The program may also be configured to initiate automated data collection guidance according to the steps outlined herein according to other actions and/or messages/input. For instance, the mobile electronic device may receive a link, and/or file through a text, email, message or the like, via the communication element, the link being configured to automatically install the program and initiate the automated data collection guidance steps. It should also be noted that a different start data collection request may be generated for each incident. It is foreseen that a program may be configured to automatically recognize a variety of triggers to initiate automated data collection guidance steps without departing from the spirit of the present invention.

Following initiation of automated data collection guidance, an incident type may be determined by the program, for example via receipt of user input comprising selection of an incident type from an automatically populated set of incident types presented by instruction of the program. The automatically populated set of incident types may be a list of incident types populated and optionally periodically updated by an insurance provider, artificial intelligence and/or the program. The automatically populated set may be populated based on consideration of laws of a state in which the user is a resident, laws of a state in which the incident occurred, information about the user, information about the user's insurance policy, etc.

The program may be configured to periodically or constantly access and/or receive GPS or similar data from a location determining element of the user's mobile electronic device and may generate the list of incident types based at least in part on such data following an incident. In some embodiments, the program may also or alternatively instruct the processing element to receive incident data, such as a description of the incident from the user, analyze the incident data, and select the incident type from the automatically populated set based on the received incident data. It is foreseen that various dynamic and static information may be relied upon to inform generation of the list of incident types with respect to each particular incident without departing from the spirit of the invention.

An automatically populated set of incident types presented to a user may include very broad categories, such as, for example, a single vehicle incident category and a multiple vehicle incident category. Other exemplary categories may include incident types such as a theft incident and/or a weather-related incident, which may be treated independently as broad categories or as sub-categories following selection of a broader category such as single/multiple vehicle incident categories. Any combination or number of incident type categories and/or sub-categories may comprise an automatically populated set.

Once an incident type is determined, the program may be configured to compare the selected incident type against a plurality of data inquiry sets. The comparison may yield a matched data inquiry set. In an embodiment, the matched data inquiry set may comprise a static set of prompts/data collection requests configured to elicit certain user input(s) comprising incident data. The data collection requests of a matched data inquiry set may also or alternatively be dynamically determined, for example where the program includes an algorithm for analyzing one or more portions of the incident data in order to select and shape presentation of remaining data collection requests of the matched data inquiry set. The matched data inquiry set may be a combination of both static and dynamically-determined prompts/data collection requests. For example, a dynamic algorithm may generate a prompt/data collection request displayed to the user asking for input of a number of vehicles involved in an incident; thereafter, depending on the number of vehicles entered, the algorithm may dynamically generate a follow-up data collection request for specific incident data about each vehicle involved.

A dynamic algorithm and/or incident data processed by the dynamic algorithm may be executed and/or collected locally, e.g., on the user mobile electronic device. It is also foreseen that a program may be configured to instruct transmission of portions of incident data to remote computing device(s) e.g., to a remote server and to receive data and/or data collection request(s) in reply to inform presentation of the remaining data collection requests of a matched data inquiry set without departing from the spirit of the present invention.

In response to the data collection request(s) of the matched data inquiry set, the incident data may be received, for example via at least one of the user interface, a sensor, and a communication element. In an embodiment, the user interface may be configured to receive incident data comprising manual input of the user. Alternatively or additionally, the program may be configured to receive the incident data via the sensor. The sensor may be any sensor known in the art including a light sensor such as a camera, an audio sensor such as a microphone, an accelerometer, etc.

Exemplary data collection requests and corresponding received incident data may take any of a variety of forms. For instance, a data collection request may comprise a request for the user to capture sensor data, for instance by taking a picture with a photographic element of the user mobile electronic device. In connection therewith, the program may instruct the processing element of the user mobile electronic device to display an immediate reference image via the user interface. The immediate reference image may be a user-friendly, highly-readable graphical display of post-accident instructions. The program may instruct display on the user interface of a request to "Take a picture of the front-left of your car" alongside a generic drawing of a vehicle from a front-left perspective. Where exemplary drawings and/or photographs more representative of the user's specific vehicle are available for use by the program, a corresponding immediate reference image may comprise same. One of ordinary skill will immediately appreciate that a wide variety of requests and visual and/or audio aides may be incorporated into data collection requests within the scope of the present invention.

The program may also be configured to instruct display at the user interface of a data collection request for pictures of other objects or aspects of the accident scene and/or involved entities. For instance, the program may be configured to generate a data collection request for one or more photographs of the user's vehicle and/or any other vehicle involved in the accident.

In an embodiment, the program may also or alternatively be configured so that incident data may be received using the microphone and stored as an audio file, and/or as a text file generated using talk to text software, on the memory element. For example, the audio data may be related to sounds generated by the accident, names of individuals involved in the incident, statements from parties involved in the accident, and/or statements from witnesses.

The program may also be configured to receive incident data via the communication element such as through near-field communication (NIT), Bluetooth®, or the like. The communication element may receive incident data from a text message, email, message on a messaging application, or a messaging feature built in the program. The communication may include any relevant incident data and be in any form such as text, audio, or images. For example, the communication element may be configured to receive incident data about a party involved in the accident directly from that party via the communication element. Data received via the communication element may also or alternatively include telematics data collected via one or more involved vehicles, weather data collected via third party database(s), policyholder data received via one or more servers of an insurance provider, and any other type of data that may be useful in completing responses to the data collection request(s). The communication element may receive GPS data which the program may utilize to determine a location of collection of incident data, such as geolocation coordinates stored as metadata for an image. Moreover, such GPS data may be used to verify the validity of incident data received from third-party devices (e.g., to verify the proximity of the originating device to the incident and/or to the user's mobile electronic device).

The program may also instruct the processing element and the communication element to access a policyholder database and receive a policyholder data file having policy data related to an insurance policy of a policyholder. The policyholder data may be displayed on the user interface and/or be processed along with the incident data by the processing element to make determinations related to insurance coverage for the incident.

Incident data received according to one or more steps outlined above may be further processed, subsequent to and/or in connection with the presentation of data collection requests and incident data collection. For instance, the program may be configured to utilize optical character recognition (OCR) and/or object recognition software to analyze images to generate additional incident data and/or metadata. In an embodiment, the program may be configured to direct the user to capture images of one or more third-party driver documents via the photographic element of the user's mobile electronic device and may execute OCR software to recognize text on the images for storage and/or inclusion in a structured incident data report or the like. More particularly, the program may be configured to request and receive images of an insurance card, driver's license, and/or license plate, and utilize OCR to determine phone number, legal name, driver's license number, state of licensure, license plate number, insurance company, policy number and/or other information from the image(s).

In an embodiment, the program may also collect incident data identifying a state of licensure for a driver (e.g., a third-party driver), and may consult a database containing information and/or metadata regarding official state documents. Such information may, for example, identify layouts (e.g., borders, landmarks such as required text with predetermined placement, etc.) of the states' official documents to help the program identify information and/or portions of the image to capture and/or classify. Additionally or in the alternative, object character recognition algorithm(s) may be utilized to identify and classify information and/or portions of the image containing certain objects (e.g., a photograph of the driver, damaged portions of a vehicle, etc.). The program may also be configured to determine for example, using object recognition software— and/or receive information related to the make, model, and/or year of vehicles involved in and/or proximate the accident. In this manner, the program may be configured to recognize, capture and/or record portions of documents or other objects, items and/or people from an image captured by the user's mobile electronic device and/or third-party devices.

The database containing data regarding official state documents may also or alternatively be consulted to display immediate reference images of template official documents and/or portions thereof, and such images may include reference arrows and/or other indicators to guide the user in capturing specific portion(s) of third-party or other official documents. In an embodiment, the immediate reference images and/or captured incident data may be utilized to automatically identify fraudulent and/or expired official documents, for instance where a layout of a third-party driver's license purportedly issued by a specific state does not match a valid layout stored in the database.

Moreover, the program may be configured to generate metadata from photographs of the accident scene and/or of relevant objects, for example to automatically determine the location and time of the incident, the weather during or soon after the accident, or to otherwise generate information that may be relevant to processing of insurance claims. Metadata and/or data extrapolated therefrom and/or from images captured by the sensor of the user's and/or a third party's mobile electronic device(s) may be combined with data from external sources (including related data discussed below)— e.g., data from third party databases and/or from telematics devices of one or more vehicles—to automatically generate additional data that may be relevant to an insurance claims process. For instance, where weather conditions may be relevant to a fault analysis, photographs of the conditions at the scene immediately following the accident may be reconciled against weather database data to identify discrepancies and/or firm up conclusions regarding conditions during the accident.

The program may also be configured to instruct the processing element of the user's mobile electronic device to access a data base, receive related data, and analyze the incident data to determine a discrepancy. For instance, the program may be configured to compare portions of the incident data with related data to identify conflicts, and/or to receive some of the incident data from the user interface and/or sensor and then access a database via the communication element to receive/verify data related to the received incident data. If there are discrepancies, the program may instruct the processing element to denote an inconsistency flag for that incident data on a structured incident data report (discussed in more detail below).

The program may also or alternatively instruct the processing element to overwrite portions of the incident data with portions of the related data in the memory element of the mobile electronic device and/or in the structured incident data report. For example, the program may instruct the processing element to determine whether there are portions of the related data that do not have corresponding portions of incident data. The program may instruct the processing element to write the related data into the structured incident data report where there is any such missing corresponding incident data. In an example, related data received from a server of an insurance provider may describe a claim made in the preceding month by the user for serious damage to his/her vehicle from an accident. Where a structured incident data report includes a "None" response to a data collection request asking the user to describe "Any recent incidents that may have led to a mechanical failure of an involved automobile," the program may be configured to insert a short reference to the prior accident within the structured incident data report in place of "None."

The program may instruct the processing element of the user's mobile electronic device to store each portion of the incident data with a reference indicating a corresponding data type collection request responsible for receipt of that portion of the incident data. To construct a structured incident data report as outlined above and using references to the portions of the incident data, the program may instruct the processing element to access a report template corresponding to the selected incident type. The report template may include a plurality of fields corresponding respectively to the references of the plurality of portions of the incident data. More particularly, portions of the report template may be embedded with the references and/or may be keyed to the corresponding data type collection request(s), permitting automated population of data fields of the report template with the corresponding portions of the incident data. It will be immediately understood by one of ordinary skill that a variety of approaches to keying and/or otherwise indexing portions of incident data to corresponding portions of a report template are within the scope of the present invention. The program may therefore instruct the processing element to access the stored incident data and generate a structured incident data report at least in part by locating the references in order to populate the plurality of fields with the stored incident data.

The program may also instruct the processing element of the user's mobile electronic device to prompt and receive confirmation, via the user interface, of a desire to transmit the structured incident data report. The program may further instruct the processing element to transmit, via the communication element, the structured incident data report to a server to initiate an accident claim process (for example, in conjunction with a confirmation process). The program may instruct the processing element to encrypt the structured incident data report at any time, including for transmission and/or local storage. For example, the incident data report may proactively be stored in an encrypted file, and/or encrypted only prior to transmission.

EXEMPLARY EMBODIMENT

In yet another embodiment, a system may be utilized for guiding and aiding a user in collecting information relevant to an insurance claim. The environment may include a mobile electronic device, a network accessible by the mobile electronic device, and one or more computer servers coupled to the network.

The mobile electronic device may be embodied by a smart watch, a smart phone, a personal digital assistant (PDA), a tablet, a palmtop or laptop computer, or other mobile devices, and is typically in a user's possession while operating a vehicle. The mobile electronic device may include a communication element, a memory element, a processing element. The mobile electronic device may further include an accelerometer, a user interface, a camera, a microphone, and a location determining element.

The communication element may generally allow communication with systems or devices external to the mobile electronic device. The communication element may include signal or data transmitting and receiving circuits, such as antennas, amplifiers, filters, mixers, oscillators, digital signal processors (DSPs), and the like. The communication element may establish communication wirelessly by utilizing RF signals and/or data that comply with communication standards such as cellular 2G, 3G, 4G, 5G, or LTE, WiFi, WiMAX, Bluetooth®, BLE, or combinations thereof. The communication element may be in communication with the processing element and the memory element.

The memory element may include data storage components, such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element may be embedded in, or packaged in the same package as, the processing element. The memory element may include, or may constitute, a "computer-readable medium". The memory element may store the instructions, code, code segments, software, firmware, programs, applications, apps, services, daemons, or the like that are executed by the processing element. In particular, the memory element may store information about a particular vehicle, policy holder, insurance policy, etc. The memory element may also be able to store all the information gathered by the mobile electronic device.

The processing element may include processors, microprocessors (single-core and multi-core), microcontrollers, DSPs, field-programmable gate arrays (FPGAs), analog and/or digital application-specific integrated circuits (ASICs), or the like, or combinations thereof. The processing element may generally execute, process, or run instructions, code, code segments, software, firmware, programs, applications, apps, processes, services, daemons, or the like. The processing element may also include hardware components such as finite-state machines, sequential and combinational logic, and other electronic circuits that can perform the functions necessary for the operation of the current invention. The processing element may be in communication with the other electronic components through serial or parallel links that include address busses, data busses, control lines, and the like.

The user interface generally allows the user to utilize inputs and outputs to interact with the mobile device. Inputs may include buttons, pushbuttons, knobs, jog dials, shuttle dials, directional pads, multidirectional buttons, switches, keypads, keyboards, mice, joysticks, microphones, or the like, or combinations thereof. Outputs may include audio speakers, lights, dials, meters, printers, or the like, or combinations thereof. With the user interface, the user may be able to control the features and operation of the mobile device. For example, the user may be able to use either virtual onscreen buttons or actual pushbuttons. In addition, the user interface may include touching and swiping of a screen of the mobile device.

Specifically, for the mobile electronic device, the memory element may store a program and the processing element may execute the program. The mobile electronic device may function as follows. The accelerometer, or similar sensor, on the mobile electronic device may output a waveform that the program instructs the processor to compare against a stored waveform indicative of an accident. If the processor outputs a match within a margin of error between the sensor's waveform and the stored waveform, then the program may then automatically instruct the processor to initiate a start data collection request. Alternatively or additionally, the user may initiate the start data collection request after an accident has occurred using the user interface.

The user interface includes a main menu from which the user may input a start data collection request, access, view, and edit incident data from prior accidents, and/or transmit a structured incident data report and thereby initiate a claim filing process. The incident data from a prior accident documentation may be stored on the memory element and/or received from an external database via the communication element. Upon receiving the start data collection request, the program may instruct the processor to display an immediate reference image to guide the user, who is likely in a distressed state. The program may instruct the processor to display an automatically populated set of incident types of which the user is prompted to select, such as an accident with a third party, a different type of accident, a weather-related accident, etc.

After receiving the selection of the incident type, the program may instruct the processor to access a database storing a plurality of predetermined data inquiry sets. The data inquiry sets may each define at least one predetermined data type collection request corresponding to an incident type of the automatically populated set of incident types. The program may instruct the processor to compare the selection of the incident type against the plurality of data inquiry sets to determine a matched data inquiry set for the selection. The program may instruct the processor to display the matched data inquiry set for the selection of the incident type. The matched data inquiry set may comprise a plurality of fields on the user interface for entering incident data relevant to filing a claim. The incident data may include information about one or more third-party driver if a third party was involved such as the one or more third-party driver's name, phone number, insurance company, policy number, license plate, driver's license number, and state that issued the driver's license. The program may instruct the processor to receive incident data by manual population of the fields via the user interface.

Alternatively or additionally, the program may instruct the processor to receive the incident data via the camera of the user's mobile electronic device. The program may instruct the processor to direct the user to capture an image of one or more third-party driver's documents using the camera. the program may instruct the processor to implement OCR algorithms to translate relevant information on the images into textual data, and then populate the information fields on the user interface based on the text gleaned from the captured images. The program may instruct the processor to receive images of the one or more other driver's insurance card, driver's license, and license plate, and then automatically populate the fields based on the images. For example, the program may instruct the processor to glean the one or more third-party's phone number, insurance company, and policy number from the image of the insurance card; the one or more third-party's name, driver's license number, and state from the image of the driver's license; and the license plate number from the image of the license plate. Alternatively or additionally, the program may instruct the processor to glean one of these types of information and access an external database via the communication element to receive related data in order to verify incident data.

Alternatively or additionally, the program may instruct the communication element to communicate with a mobile device of another party. The communication may include near-field communication, Bluetooth®, or the like, or transmitting information over the network or internet. The communication may include a text message, email, message on a messaging application, or a messaging feature. The communication may include all or portions of the incident data relevant to the other party. For example, if the user and the other party both have mobile electronic devices having the program installed thereon, the programs on their respective mobile electronic devices may instruct their respective communication elements and/or processors to exchange portions or all incident data relevant to the accident when directed by the user and/or other party.

The program may also instruct the processor to display fields on the user interface for adding incident data such as one or more witnesses and their statements. The program may instruct the processor to display fields on the user interface for inputting the one or more witnesses' names and phone numbers, as well as a field for taking statements. The program may instruct the processor to record the one or more witnesses' statements using the microphone of the mobile electronic device and save the recording as an audio file and/or as a text file generated using talk-to-text algorithms. The program may instruct the processor to receive the one or more witnesses' statements via text, email, or the like, through the communication element over the network or otherwise.

The program may also instruct the processor to direct the user via the user interface to capture images of the user's car and any other car involved using the camera. The program may instruct the processor to receive information about the cars such as the make, model, and year of the cars, and the program may instruct the processor to direct the user to capture images with the camera from various angles, such as views of the vehicles from each corner of the vehicles.

The program may also instruct the processor to direct the user to take pictures of the incident scene using the camera. The program may instruct the processor to generate metadata in association these pictures. The metadata may be the location and time of the incident received from live data feeds, as well as the weather during the accident received from third-party programs. The program may also instruct the processor to direct the user to record the location, date, and time of the incident by manually inputting the information into the user interface. Additionally or alternatively, the program may instruct the processor to access the location determining element to automatically, or upon direction by the user via the user interface, record the time, date, and location.

After all the incident data is collected, the program may instruct the processor to store the incident in a file on the memory element of the mobile electronic device. The program may further instruct the processor to display on the user interface an option of transmitting a copy of the incident data to a selected destination. The transmitting may include text, email, messaging applications, saving on a cloud, and the like. For example, the program may instruct the processor to email the copy of the incident data to a specified email address, or transmit the copy to an external database, such as Dropbox®, Google Drive, or the like, via the communication element.

The program may also instruct the processor to display options on the user interface to view a policy coverage of the user, request a ride in-application (such as utilizing the telephone capability of the mobile device to contact a taxi service, or interacting with a third-party application such as Uber® or Lyft®), request a tow, receive a repair estimate, file a claim for the accident, or talk to an agent.

The program may instruct the processor access a policyholder database and receive a policyholder data file having policy data related to an insurance policy of a policyholder. The program may instruct the processor to display a coverage feature on the user interface, which provides a summary of the user's policy and includes information about the deductible and any other relevant parts of the policy including paying for a rental car and/or travel expenses. The program may instruct the processor to analyze the images of the user's vehicle and the policy data to provide information about coverage.

To resolve first notice of loss issues, the program may instruct the processor to notify the user via the user interface that a claim has not been filed and require that the user take affirmative steps to file a claim and send the incident data to an insurance carrier. The program may instruct the processor to store the incident data in a file in the memory element of the mobile electronic device. The program may enable a user to access and/or transmit the file via the processor at a later time.

The network may generally allow communication between the mobile electronic device and the server (and/or between other external servers and databases), such as via wireless communication or data transmission over one or more radio links or wireless communication channels. The network may include local area networks, metro area networks, wide area networks, cloud networks, the Internet, cellular networks, plain old telephone service (POTS) networks, and the like, or combinations thereof. The network may be wired, wireless, or combinations thereof and may include components such as modems, gateways, switches, routers, hubs, access points, repeaters, towers, and the like. The mobile electronic device and/or the server may connect to the network wirelessly, such as radio frequency (RF) communication using wireless standards such as cellular 2G, 3G, 4G, 5G, or LTE, Institute of Electrical and Electronics Engineers (IEEE) 802.11 standards such as WiFi, IEEE 802.16 standards such as WiMAX, Bluetooth®, or combinations thereof.

Turning to the server of embodiments of the present invention, such a server may be embodied by one or more personal computers such as desktop workstations and/or laptop computers, and/or by application servers, database servers, file servers, gaming servers, mail servers, print servers, web servers, or the like, or combinations thereof. Furthermore, the server may include a plurality of servers, virtual servers, or combinations thereof. The server may be configured to include or execute computer programs and software such as file storage applications, database applications, email or messaging applications, web server applications, or the like, in addition to and/or in conjunction with the computer program and/or software described elsewhere herein (e.g., the source application, the integration application, and/or the inflation application).

The server may include a communication element, a memory element, and a processing element (not shown). The communication element generally allows communication with external systems or devices and/or between one or more individual servers. The communication element may include signal or data transmitting and receiving circuits, such as antennas, transceivers, amplifiers, filters, mixers, oscillators, digital signal processors (DSPs), and the like. The communication element may establish communication wirelessly by utilizing RF signals and/or data that comply with communication standards such as cellular 2G, 3G, 4G, 5G, or LTE, IEEE 802.11 standard such as WiFi, IEEE 802.16 standard such as WiMAX, Bluetooth®, or combinations thereof. Alternatively, or in addition, the communication element may establish communication through connectors or couplers that receive metal conductor wires or cables which are compatible with networking technologies such as ethernet. In certain embodiments, the communication element may also couple with optical fiber cables. The communication element may be in communication with or electronically coupled to memory element and/or processing element.

The memory element may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory element may include, or may constitute, a "computer-readable medium". The memory element may store the instructions, code, code segments, software, firmware, programs, applications, apps, services, daemons, or the like that are executed by the processing element. The memory element may also store settings, data, documents, sound files, photographs, movies, images, databases, and the like.

The processing element may include processors, microprocessors, microcontrollers, DSPs, field-programmable gate arrays (FPGAs), analog and/or digital application-specific integrated circuits (ASICs), or the like, or combinations thereof. The processing element may generally execute, process, or run instructions, code, code segments, software, firmware, programs, applications, apps, processes, services, daemons, or the like. The processing element may also include hardware components, such as finite-state machines, sequential and combinational logic, and other electronic circuits that may perform the functions necessary for the operation of embodiments of the current inventive concept. The processing element may be in communication with the other electronic components through serial or parallel links that include address busses, data busses, control lines, and the like.

The server may be configured to receive the incident data from the user via the network. The server may be configured to analyze the incident data to determine insurance policy coverage, accident fault, fraudulent filing, extent of damage, estimated repair costs, etc. The server may be configured to then transmit some or all of this information to the mobile electronic device of the user via the network.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently, configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U. S. C. § 112(f) unless traditional means-plus-function language is expressly recited, such as "means for" or "step for" language being explicitly recited in the claim (s).

Although the invention has been described with reference to the embodiments illustrated in the attached drawing figures, it is noted that equivalents may be employed, and substitutions made herein without departing from the scope of the invention as recited in the claims.

We claim:

1. A computer-implemented method for capturing vehicle incident data associated with a vehicle incident, the computer-implemented method comprising:
receiving a start data collection request associated with a potential claim against an insurance policy of a policyholder relating to the vehicle incident;
receiving location data representative of the vehicle incident, wherein the location data comprises state data including one or more of a state in which the start data collection request originated, a state in which the vehicle incident occurred, or a state in which the policyholder is a resident;
generating via a processor based on the received location data including the state data, and providing via a user interface, an automatically populated set of state-specific incident types;
receiving, via the user interface, a selection of an incident type from the automatically populated set of state-specific incident types;
accessing, via a processor, a database storing a plurality of predetermined data inquiry sets, each data inquiry set defining at least one predetermined data type collection request corresponding to an incident type of the automatically populated set of state-specific incident types;
comparing, via the processor, the selection against the plurality of data inquiry sets to determine a matched data inquiry set for the selection;
displaying, via the user interface, the at least one predetermined data type collection request of the matched data inquiry set;
receiving, via at least one of the user interface, a communication element, or a sensor, the incident data in response to the at least one predetermined data type collection request, wherein the sensor comprises a photographic element;

generating, via the processor, metadata associated with the incident data received from the photographic element;

receiving, via the communication element, related data, wherein the related data includes a policyholder data file having policy data related to the insurance policy of the policyholder;

comparing the incident data and the related data to identify at least one inconsistency;

storing, via the processor, the received incident data, portions of the related data, the meta data, and the at least one inconsistency;

analyzing via the processor, the incident data and the policyholder data file to make a policy coverage determination associated with the potential claim; and displaying, via the user interface, the policy coverage determination.

2. The computer-implemented method of claim 1, wherein each of a plurality of portions of the incident data is stored with a reference indicating a corresponding one of the at least one predetermined data type collection request associated with receipt of the portion, further comprising:

receiving confirmation via the user interface of a desire to transmit a structured incident data report;

accessing, via the processor, a report template corresponding to the selected incident type, the report template including a plurality of fields corresponding respectively to the references of the plurality of portions of the incident data;

accessing, via the processor, the stored incident data;

generating, via the processor, the structured incident data report at least in part by locating the references to populate the plurality of fields with the stored incident data;

transmitting, via the communication element, the structured incident data report to a server, the server being configured to store data in connection with insurance claim processes.

3. The computer-implemented method of claim 2, wherein the related data includes at least one of: data associated with the policyholder; data associated with the incident; data generated by a mobile device; or data generated by a telematics device.

4. The computer-implemented method of claim 3, further comprising:

determining, via the processor, whether one or more portions of the structured incident data report do not contain any of the incident data;

wherein generating the incident data report includes writing, via the processor, at least some of the related data into the one or more portions of the structured incident data report that do not contain any of the incident data.

5. The computer-implemented method of claim 2, further comprising denoting, via the processor, an inconsistency flag on the structured incident data report representing the at least one inconsistency.

6. The computer-implemented method of claim 5, wherein generating the incident data report includes overwriting, via the processor, at least a portion of the incident data with at least a portion of the related data within the structured incident data report.

7. The computer-implemented method of claim 2, further comprising encrypting, via the processor, the structured incident data report.

8. The computer-implemented method of claim 1, wherein displaying the data type collection request includes displaying, via the processor, an immediate reference image on the user interface.

9. The computer-implemented method of claim 1, further comprising displaying, via the processor, policy data of the data file on the user interface.

10. The computer-implemented method of claim 1 wherein the sensor is an audio sensor.

11. The computer-implemented method of claim 1, wherein at least some of the incident data is received from the sensor and storing the incident data includes:

translating, via the processor, the incident data received from the sensor into converted text;

determining, via the processor, placements of portions of the converted text with respect to the report template;

storing, via the processor, the portions of the converted text based on the determined placements.

12. The computer-implemented method of claim 1, further comprising detecting, via a sensor in electronic communication with the processor, a signal indicative of the incident.

13. The computer-implemented method of claim 1, further comprising determining geolocation coordinates and storing the geolocation coordinates with the structured incident data report via the processor.

14. The computer-implemented method of claim 1, wherein the incident data includes a time of the incident, further comprising receiving, via the communication element, a data related to weather at the time of the incident.

15. The computer-implemented method of claim 1, wherein the incident data includes data points from a live data feed generated by the sensor.

16. The computer-implemented method of claim 1, wherein the related data includes at least one of: data associated with the policyholder; data associated with the incident; data generated by a mobile device; or data generated by a telematics device.

17. The computer-implemented method of claim 16, further comprising:

generating, via the processor, an incident data report; and transmitting, via the communication element, the incident data report to a server, the server being configured to store data in connection with insurance claim processes.

18. The computer-implemented method of claim 17, wherein generating the incident data report includes overwriting, via the processor, at least a portion of the incident data with at least a portion of the related data within the incident data report.

19. The computer-implemented method of claim 1, wherein:

the method further comprises:

analyzing one or more portions of the received incident data; and selecting the data type collection request based on the analysis of the incident data; and displaying the data type collection request includes displaying the selected data type collection request.

20. The computer-implemented method of claim 1 wherein receiving the start data collection request comprises receiving the start data collection request via a user interface.

21. The computer-implemented method of claim 1, wherein:
- receiving the location data includes receiving data representative of the location of collection of the received incident data; and
- the method further comprises verifying validity of the incident data based on the received data representative of the location of collection of the received incident data.

* * * * *